(12) United States Patent
Mizushima et al.

(10) Patent No.: US 8,192,030 B2
(45) Date of Patent: Jun. 5, 2012

(54) LASER ILLUMINATING DEVICE AND IMAGE DISPLAY DEVICE

(75) Inventors: Tetsuro Mizushima, Osaka (JP); Kenichi Kasazumi, Osaka (JP); Tatsuo Itoh, Osaka (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 12/531,769

(22) PCT Filed: Mar. 14, 2008

(86) PCT No.: PCT/JP2008/000601
§ 371 (c)(1),
(2), (4) Date: Sep. 17, 2009

(87) PCT Pub. No.: WO2008/114502
PCT Pub. Date: Sep. 25, 2008

(65) Prior Publication Data
US 2010/0053565 A1    Mar. 4, 2010

(30) Foreign Application Priority Data

Mar. 19, 2007   (JP) .................................. 2007-070153

(51) Int. Cl.
*G03B 21/00* (2006.01)
(52) U.S. Cl. ................. 353/31; 353/30; 353/33; 353/38; 353/84; 353/98; 353/99; 353/119; 353/122

(58) Field of Classification Search ............. 353/30, 353/31, 33, 38, 84, 98, 99, 119, 122; 359/20, 359/455, 463, 231, 245, 237, 238, 279, 310, 359/316, 291, 558, 559, 599, 619, 618, 621, 359/622, 712; 372/23, 24, 50.12, 50.123, 372/50.23, 101, 29.01, 29.014, 29.015, 38.02, 372/38.07, 29.011, 29.02, 38.01, 39, 43.01
See application file for complete search history.

(56) References Cited

U.S. PATENT DOCUMENTS 5,420,417 A * 5/1995 Shiraishi ................. 250/205
(Continued)

FOREIGN PATENT DOCUMENTS
JP    60-166951    8/1985
(Continued)

OTHER PUBLICATIONS

Supplementary European Search Report issued Jan. 25, 2011 in Application No. EP 08 72 0487.

(Continued)

*Primary Examiner* — Georgia Y Epps
*Assistant Examiner* — Sultan Chowdhury
(74) *Attorney, Agent, or Firm* — Wenderoth, Lind, Ponack, L.L.P.

(57) ABSTRACT

A laser illuminating device and an image display device are provided to enable a removal of speckle noises in a diffraction field and an image field, to uniformly illuminate an illumination plane, and to realize miniaturization. The laser illuminating device 100 includes a laser light source 3 and a first lens 1 including a plurality of microlenses 10, each having a predetermined numerical aperture in an in-plane direction, and each of the microlenses 10 being adapted to expand laser light emitted from the laser light source 3 to thereby superimpose the laser light transmitted through each of the microlenses 10. The laser illuminating device 100 also includes a second lens 2 having an effective diameter larger than an effective diameter of the first lens 1, and compensating for a divergence angle of the laser light expanded by each of the plurality of the microlenses 10.

16 Claims, 13 Drawing Sheets

U.S. PATENT DOCUMENTS

| | | | |
|---|---|---|---|
| 6,081,381 A | 6/2000 | Shalapenok et al. | |
| 6,490,094 B2 * | 12/2002 | Daniell | 359/622 |
| 6,594,090 B2 | 7/2003 | Kruschwitz et al. | |
| 6,717,735 B2 * | 4/2004 | Smith | 359/626 |
| 6,846,080 B2 * | 1/2005 | Inoue et al. | 353/37 |
| 7,643,194 B2 * | 1/2010 | Shikii et al. | 359/216.1 |
| 7,646,518 B2 * | 1/2010 | Kasazumi | 359/196.1 |
| 7,967,452 B2 * | 6/2011 | Itoh et al. | 353/99 |
| 2001/0048560 A1 | 12/2001 | Sugano | |
| 2003/0039036 A1 | 2/2003 | Kruschwitz et al. | |
| 2005/0168817 A1 * | 8/2005 | Yamashita et al. | 359/487 |
| 2006/0290903 A1 | 12/2006 | Inoko et al. | |
| 2007/0024977 A1 | 2/2007 | Kawamura et al. | |
| 2008/0225361 A1 | 9/2008 | Kasazumi et al. | |
| 2009/0103176 A1 * | 4/2009 | Mizushima et al. | 359/449 |
| 2009/0161031 A1 | 6/2009 | Kaise | |
| 2010/0097674 A1 | 4/2010 | Kasazumi et al. | |
| 2010/0171927 A1 * | 7/2010 | Kitano et al. | 353/20 |

FOREIGN PATENT DOCUMENTS

| | | |
|---|---|---|
| JP | 64-11326 | 1/1989 |
| JP | 1-153506 | 10/1989 |
| JP | 5-251309 | 9/1993 |
| JP | 8-286382 | 11/1996 |
| JP | 10-161295 | 6/1998 |
| JP | 10-293268 | 11/1998 |
| JP | 11-64789 | 3/1999 |
| JP | 2001-51237 | 2/2001 |
| JP | 2003-98476 | 4/2003 |
| JP | 2006-309207 | 11/2006 |
| WO | 02/05038 | 1/2002 |

OTHER PUBLICATIONS

International Search Report issued Jun. 3, 2008 in International (PCT) Application No. PCT/JP2008/000601.

Office Action mailed Feb. 1, 2012 in corresponding European Application No. 08 720 487.1.

* cited by examiner

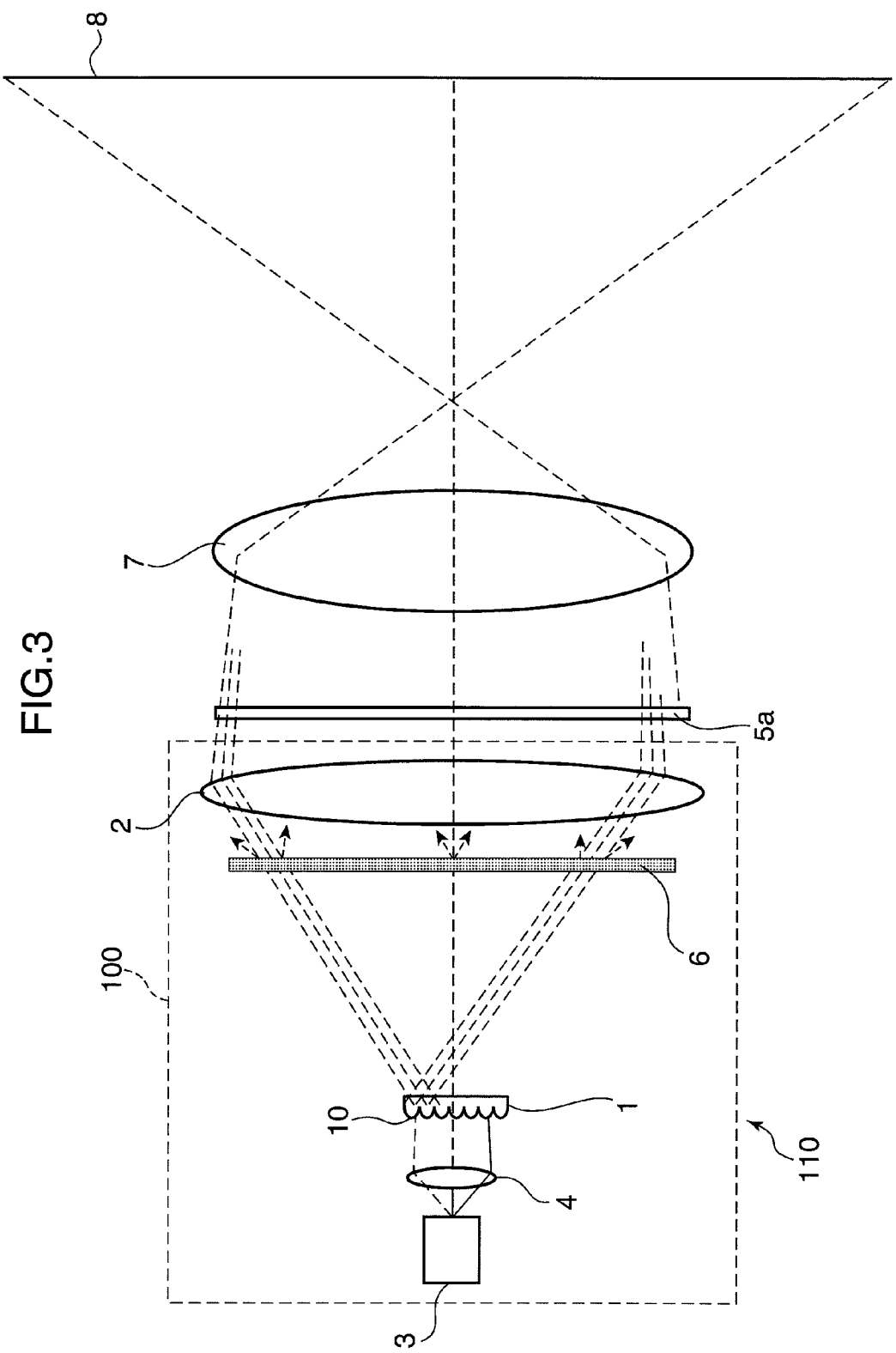

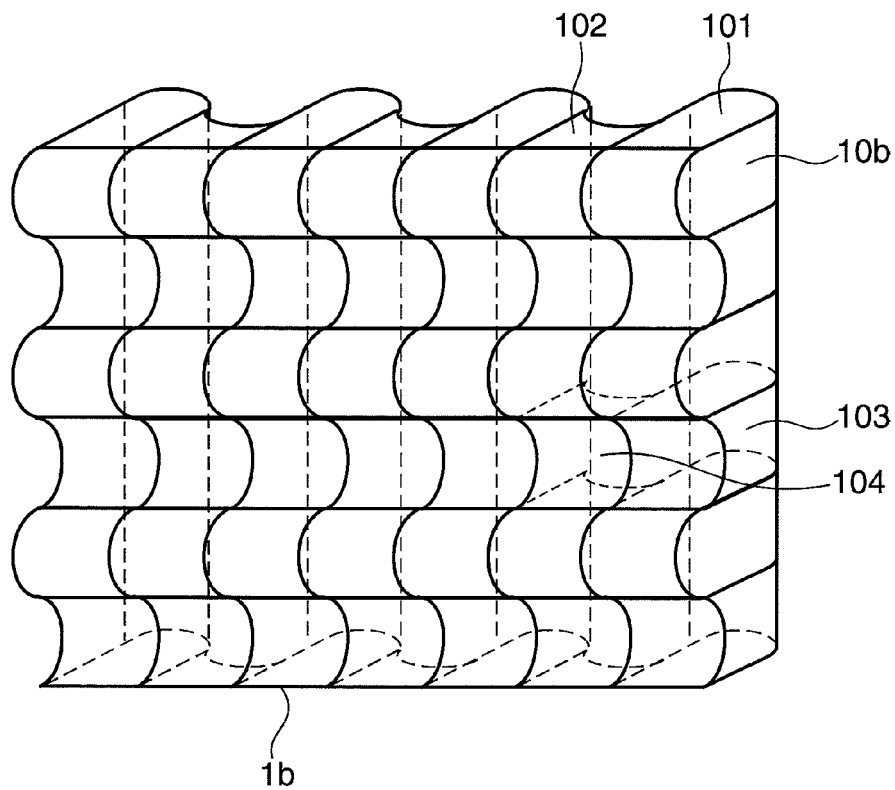
FIG.9A
FIG.9B
FIG.9C
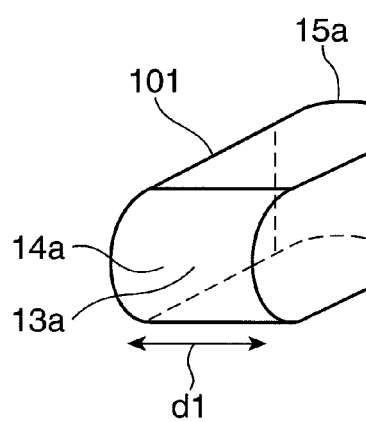
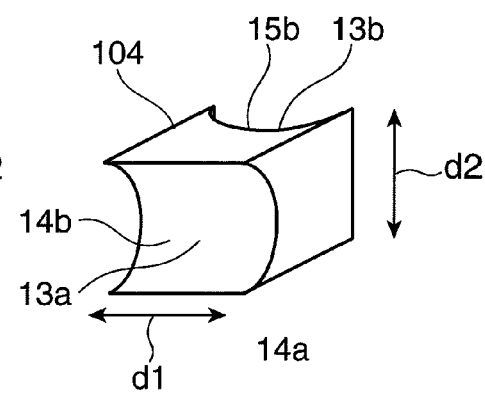

LASER ILLUMINATING DEVICE AND IMAGE DISPLAY DEVICE

TECHNICAL FIELD

The present invention relates to a laser illuminating device incorporated with a laser as a light source, and an image display device such as a projection display incorporated with the laser illuminating device.

BACKGROUND ART

In recent years, there has been widely used an image display device such as a projection display for displaying an image on a screen. Generally, a lamp light source is used in the projection display. The lamp light source, however, has drawbacks that the life is short, the color reproducing area is limited, the light source area is large, and the light use efficiency is low.

In order to solve the above drawbacks, there is proposed an idea of using a laser light source as a light source in an image display device. Since the laser light source has a long life and a strong light directivity, as compared with a lamp light source, the light use efficiency can be easily increased. Since the laser light source emits monochromatic light, the color reproducing area is large, and a clear image can be displayed. Further, as compared with a conventional lamp light source, the laser light source can be miniaturized, and an optical component can be miniaturized because the laser light source is a point light source. Thus, it is conceived that the laser light source can be applied to a portable projector, which has not been available in the conventional art.

However, in a projection display incorporated with a laser light source, speckle noise may be generated resulting from high interference of laser light. The speckle noise is roughly classified into speckle noise in a diffraction field, wherein a pattern generated in an optical system is displayed on a display plane; and speckle noise in an image field, wherein laser light is scattered on a display plane, and the scattered light turns into micro grain noises in the eyes of a viewer. The former speckle noise in a diffraction field causes a problem in an exposing machine and an illuminating optical system, and both of the speckle noise in a diffraction field and the speckle noise in an image field cause a problem in a projection display incorporated with a laser light source.

It is necessary to provide an optical system for uniformly illuminating a display apparatus as required in order to miniaturize a projection display, while utilizing a characteristic of a point light source, which is different from an optical system incorporated with a conventional lamp or a conventional LED as a light source. It is necessary to increase the light use efficiency in order to miniaturize a display apparatus, in view of a problem relating to an exothermic operation.

Heretofore, there have been proposed various improvements in a display apparatus incorporated with a laser light source to reduce speckle noise or uniformly illuminate the display apparatus.

For instance, in patent literature 1, uniform illumination of a spatial modulator and speckle noise reduction are performed by combining a beam shaping optics constituted of a laser light source, a beam expander, two sets of fly-eye lenses, a condenser lens, and a field lens; and a movable diffuser. However, the optical system proposed in patent literature 1 has a size as large as the size of an optical system required in a lamp light source, and accordingly, miniaturization of the optical system is difficult.

Patent literature 2 proposes an arrangement constituted of a combination of lens arrays having a shortened optical path, and a condenser lens in order to shorten the distance between fly-eye lenses in an exposing machine. However, in patent literature 2, sufficient miniaturization of an optical system has not been achieved, and the number of parts is increased.

There is also proposed an idea of utilizing an element applied with processing in the order of the wavelength such as a diffraction element or an HOE element, as beam shaping means for a laser light source. However, the aforementioned elements have a restriction on the use wavelength and the incident angle, and it is difficult to make the light intensity uniform or perform accurate beam shaping with respect to a multi-wavelength light source or plural light sources.

The conventional proposals have failed to miniaturize a laser illuminating device incorporated with a laser light source, and an image display device incorporated with the laser illuminating device, while removing speckle noise and performing uniform illumination. Thus, there is a serious problem to overcome in fabricating a portable projector utilizing a characteristic of a laser light source. Further, it is necessary to realize speckle noise removal, uniform illumination, and miniaturization of the device with use of a laser light source for emitting laser light of three or more colors in order to display a color image.

Patent literature 1: JP 2003-98476A
Patent literature 2: JP 2006-309207A

DISCLOSURE OF THE INVENTION

In view of the above, it is an object of the invention to provide a laser illuminating device and an image display device that enable to remove speckle noises in a diffraction field and an image field, uniformly illuminate an illumination plane, and realize miniaturization.

A laser illuminating device according to an aspect of the invention includes: a laser light source; a first lens including a plurality of microlenses each having a predetermined numerical aperture in an in-plane direction, each of the plurality of the microlenses being adapted to expand laser light emitted from the laser light source to thereby superimpose the laser light transmitted through each of the microlenses; and a second lens having an effective diameter larger than an effective diameter of the first lens, and for compensating for a divergence angle of the laser light expanded by each of the plurality of the microlenses.

An image display device according to another aspect of the invention includes the aforementioned laser illuminating device, and a light modulator disposed on a laser light exit side of the second lens, and for modulating the laser light exiting from the second lens.

According to the invention, since each of the plurality of the microlenses is operable to expand the laser light emitted from the laser light source for superimposition, speckle noises in a diffraction field and an image field can be removed. Further, each of the plurality of the microlenses having the predetermined numerical aperture in the in-plane direction is operable to uniformly illuminate an illumination plane. Furthermore, since the plurality of the microlenses of the first lens are operable to expand the laser light emitted from the laser light source and superimpose the expanded laser light, there is no need of providing plural optical systems such as an optical system for expanding laser light and a relay optical system for superimposing laser light. This enables to realize miniaturization.

These and other objects, features and advantages of the present invention will become more apparent upon reading of the following detailed description along with the accompanying drawings.

BRIEF DESCRIPTION OF THE DRAWINGS

FIG. 3 is a schematic diagram showing an arrangement of an image display device in the first embodiment of the invention.

FIG. 9A is an enlarged view showing a first lens in the fourth embodiment of the invention, FIG. 9B is an enlarged view showing a microlens constituted of a convex cylindrical lens portion and a convex cylindrical lens portion, and FIG. 9C is an enlarged view showing a microlens constituted of a concave cylindrical lens portion and a concave cylindrical lens portion.

BEST MODE FOR CARRYING OUT THE INVENTION

In the following, embodiments of the invention are described referring to the accompanying drawings. The embodiments are merely examples embodying the invention, and do not limit the technical scope of the invention.

(First Embodiment)

Figure 1:
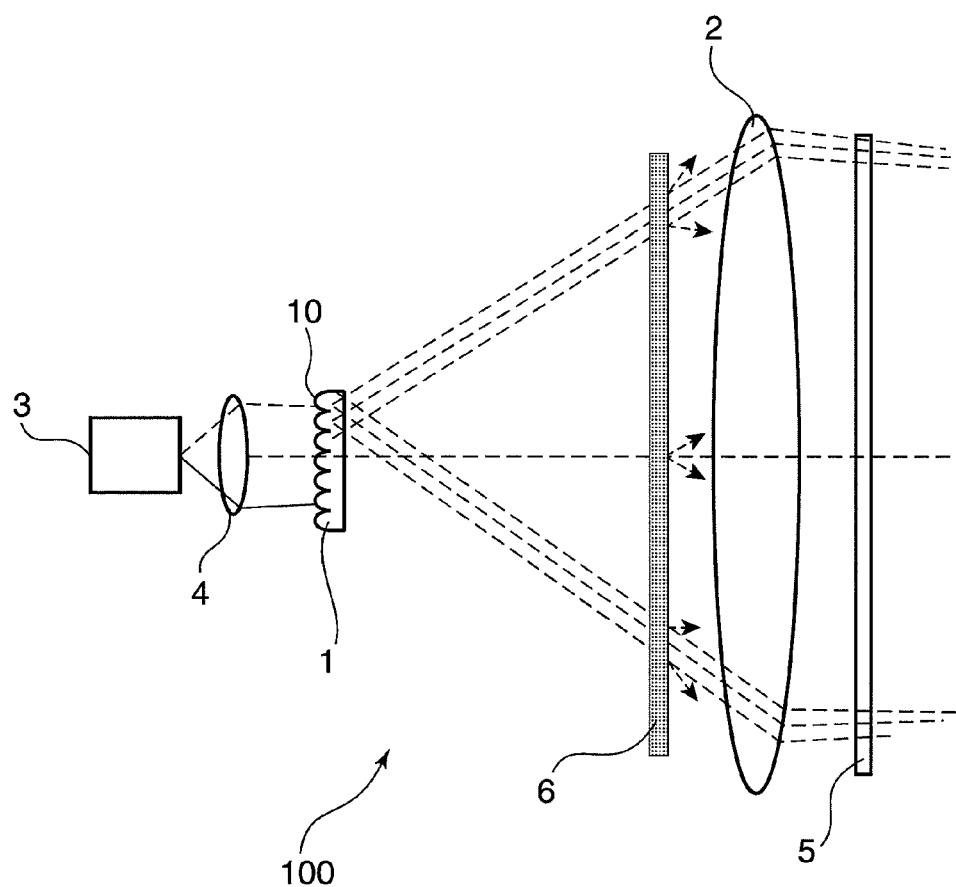
FIG. 1 is a schematic diagram showing an arrangement of a laser illuminating device in the first embodiment of the invention.

FIG. 1 is a schematic diagram showing an arrangement of a laser illuminating device 100 in the first embodiment of the invention. The laser illuminating device 100 shown in FIG. 1 is an illuminating device incorporated with a laser light source.

The laser illuminating device 100 includes a first lens 1, a second lens 2, a laser light source 3, a collimator lens 4, and a light diffuser 6.

The laser light source 3 emits laser light. In the first lens 1, a plurality of microlenses 10 each having a predetermined numerical aperture (NA) in the in-plane direction are arranged in such a manner as to expand the laser light emitted from the laser light source 3 to thereby superimpose the laser light transmitted through each of the microlenses 10.

Laser light emitted from the laser light source 3 is collimated by the collimator lens 4, and then incident into the first lens 1 constituted of plural lens arrays each formed of a predetermined number of microlenses 10. The laser light incident into the first lens 1 is expanded, while being subjected to superimposition depending on the predetermined NA of the microlenses 10, diffused through the light diffuser 6, and incident into the second lens 2 having an effective diameter larger than the effective diameter of the first lens 1.

The second lens 2 has such a lens power that a laser beam expanded by the first lens 1 is aligned substantially in parallel to the optical axis, or an outer perimeter of a laser beam is inwardly bent so as to illuminate the illumination plane 5 in a state that the divergence angle of laser light through the first lens 1 is compensated for. Specifically, the second lens 2 has an effective diameter larger than the effective diameter of the first lens 1 to compensate for the divergence angle of laser light expanded by each of the microlenses 10.

Figure 2:
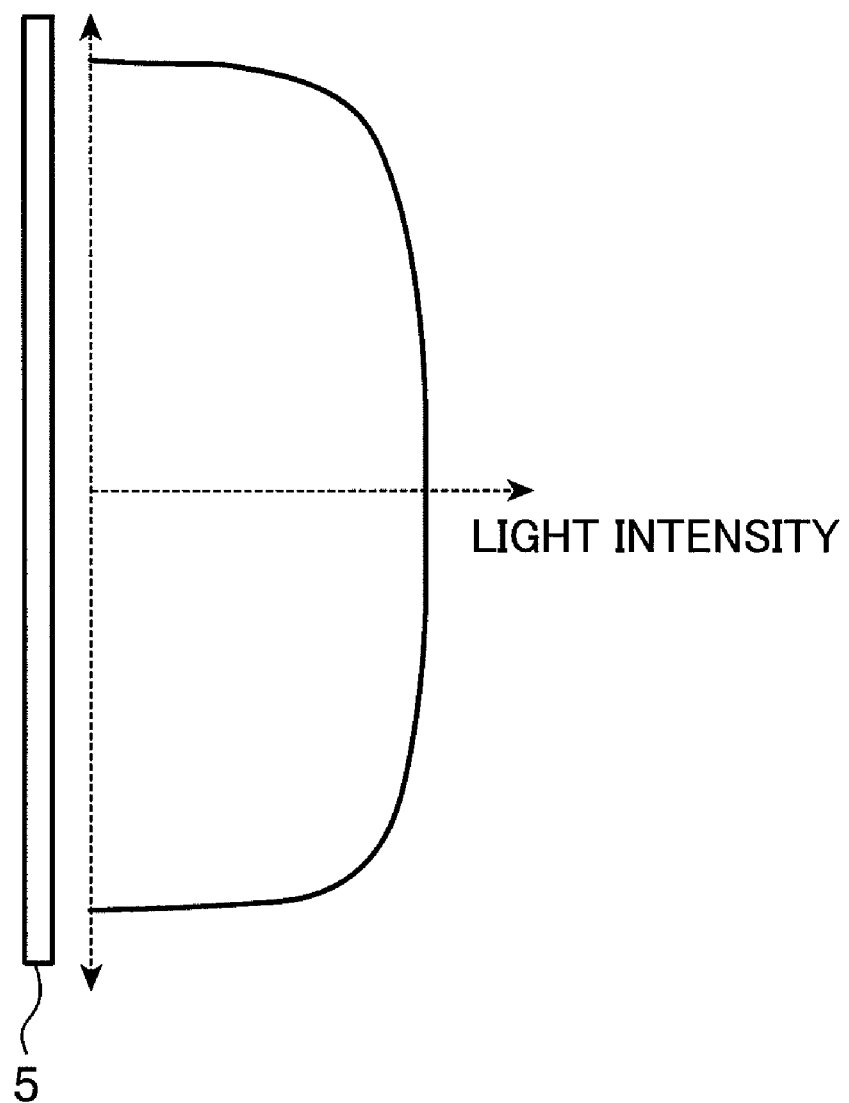
FIG. 2 is a diagram showing a light intensity distribution of laser light on an illumination plane in FIG. 1.

FIG. 2 is a diagram showing a light intensity distribution of laser light on the illumination plane 5 in FIG. 1. As shown in FIG. 2, laser light for illuminating the illumination plane 5 has a light intensity variation on an outer perimeter of a laser beam compensated for by the second lens 2, while being subjected to shaping into a predetermined shape depending on the NA of the microlenses 10. Thereby, the illumination plane 5 has a uniform light intensity distribution. Further, laser light for illuminating the illumination plane 5 has a uniform light intensity distribution in an extended area on the exit side of the second lens 2 by compensating the divergence angle of laser light through the first lens 1 by the second lens 2. Also, speckle noise is reduced by superimposing laser light expanded by the microlenses 10.

In the case where the laser illuminating device 100 is used in an image display device, a two-dimensional light modulator is disposed at a position corresponding to the illumination plane 5. FIG. 3 is a schematic diagram showing an arrangement of an image display device 110 in the first embodiment of the invention. The image display device 110 in the first embodiment includes the laser illuminating device 100, a two-dimensional light modulator 5a, a projection lens 7, and a screen 8.

The laser illuminating device 100 illuminates the two-dimensional light modulator 5a with beam-shaped and uniform laser light with a reduced speckle noise. The two-dimensional light modulator 5a modulates laser light transmitted through the second lens 2. Since the laser light modulated by the two-dimensional light modulator 5a has its divergence angle compensated for by the second lens 2, the laser light is efficiently guided to the projection lens 7, and an image modulated by the two-dimensional light modulator 5a is projected onto the screen (display plane) 8.

Figure 4A:
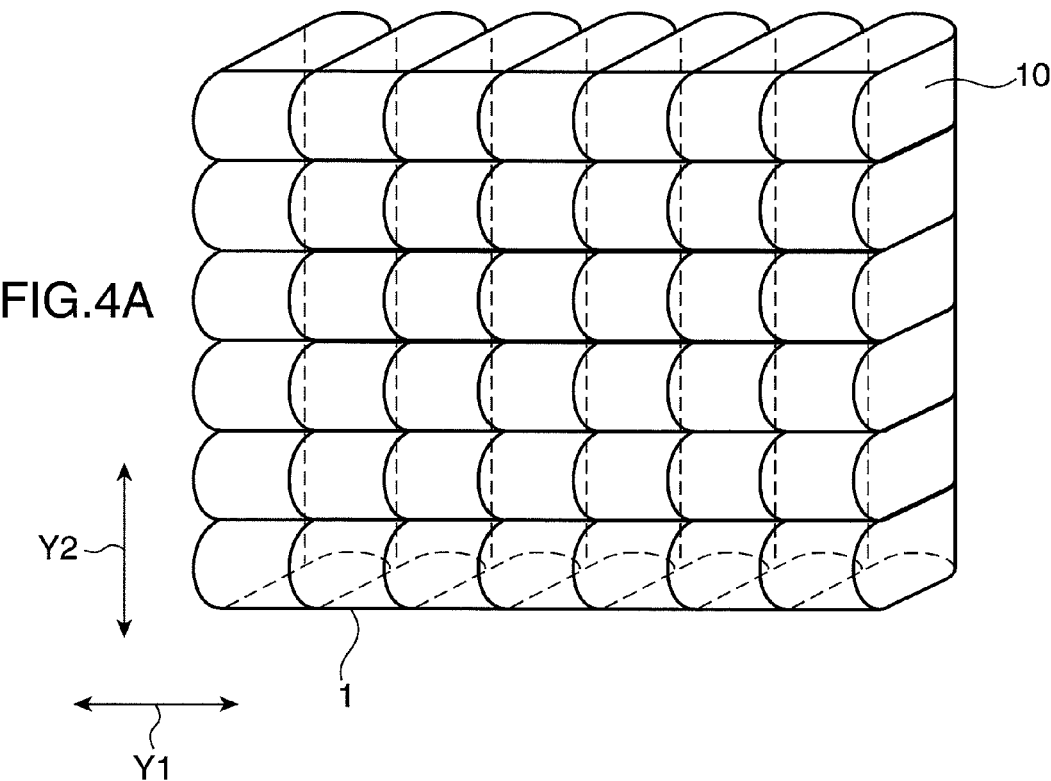
FIG. 4A is an enlarged view showing a first lens in the first embodiment of the invention.
Figure 4B:
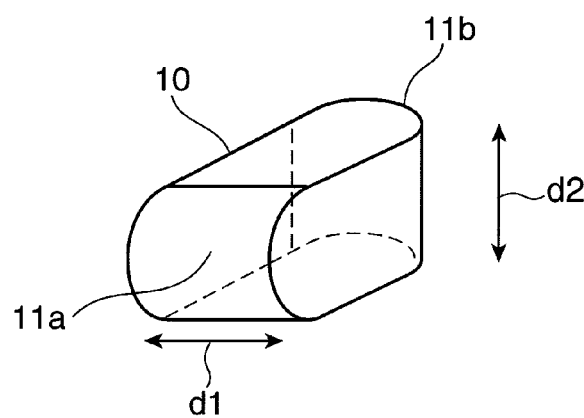
FIG. 4B is an enlarged view showing one of microlenses shown in FIG. 4A.

The microlens 10 has a predetermined NA in the in-plane direction. The respective microlenses 10 have a predetermined identical NA. FIG. 4A is an enlarged view showing the first lens in the first embodiment of the invention, and FIG. 4B is an enlarged view showing one of the microlenses shown in FIG. 4A.

The first lens 1 has the microlenses 10. Each of the microlenses 10 in the first embodiment includes a first cylindrical lens portion 11a which is formed in a horizontal direction on the laser light incident side of the microlens 10, with a first NA; and a second cylindrical lens portion 11b which is formed in a vertical direction on the laser light exit side of the microlens 10, with a second NA different from the first NA. Laser light incident into the first lens 1 is expanded in the vertical direction with an angle corresponding to the first NA, and is expanded in the horizontal direction with an angle corresponding to the second NA by the microlenses 10. Specifically, the first cylindrical lens portion 11a and the second cylindrical lens portion 11b are formed in such a manner that diffusing directions of laser light intersect normal to each other. Laser light transmitted through each one of the microlenses 10 is superimposed over laser light transmitted through the microlenses 10 adjacent to the each one microlens 10, while being subjected to expansion.

The first lens 1 expands laser light emitted from the laser light source 3 by each of the microlenses 10, and the laser light expanded by each of the microlenses 10 is superimposed on the illumination plane 5 by light expansion. Generally, in an optical system incorporated with fly-eye lenses, an image formed by microlenses of a first set of fly-eye lenses is superimposedly formed on an illumination plane via a second set of fly-eye lenses and a condenser lens. On the other hand, the first lens 1 in the first embodiment is operable to superimpose laser light transmitted through each of the microlenses 10 with a divergence angle of laser light through the microlenses 10. In the superimposition, the light is superimposed with a displacement corresponding to the size of the microlens 10.

Laser light transmitted through the first lens 1 is shaped into a rectangular beam having an aspect ratio equal to a ratio between the first NA and the second NA, and the light intensity distribution of laser light is made uniform by superimposing the laser light through the microlenses 10. Changing the NA distribution of the microlenses 10 in the in-plane direction enables to form a laser beam into a rectangular shape, a triangular shape, a hexagonal shape, a circular shape, a fan-like shape, a doughnut shape, a star-like shape, or the like. For instance, in the case where a laser beam is formed into a doughnut shape, a conical lens may be used as the microlens 10.

As described above, the laser light intensity distribution is made uniform by the first lens 1. However, since the laser light is superimposed by a displacement corresponding to the size of the microlens 10, the light intensity may vary resulting from a difference in degree of superimposition of laser light. For instance, if light having a general Gaussian distribution is incident into the first lens 1, a light intensity distribution has a mountain-like shape, wherein the light intensity is gradually decreased from a central portion to an outer perimeter of laser light. This is because the number of laser beams to be superimposed is reduced from the central portion toward the outer perimeter of laser light. The second lens 2 compensates the angle of laser light expanded by the microlenses 10, and has such a lens power that the expanded laser light is aligned substantially in parallel to the optical axis, or an outer perimeter of the expanded laser light is inwardly bend. Since an outer perimeter of laser light transmitted through the first lens 1 has a small degree of beam superimposition by the microlenses 10, the light intensity is lowered. In this embodiment, however, the light intensity distribution can be made uniform by superimposing the outer perimeters of laser beams on the illumination plane 5 by the second lens 2.

Since an outer perimeter of laser light transmitted through the first lens 1 has a small degree of beam superimposition by the microlenses 10, it is difficult to sufficiently reduce speckle noise. In this embodiment, however, speckle noise on an outer perimeter of laser light for illuminating the illumination plane 5 can be sufficiently reduced by superimposing outer perimeters of laser beams on the illumination plane 5 by the second lens 2. The second lens 2 is also operable to compensate for spherical aberration generated in the microlenses 10, and suppress light intensity lowering on the outer perimeter of laser light. A spherical flat convex lens or a biconvex lens may be used as the second lens 2.

The laser illuminating device 100 in this embodiment includes the laser light source 3; the first lens 1 including the microlenses 10 each having the predetermined NA in the in-plane direction, each of the microlenses 10 being operable to expand the laser light emitted from the laser light source 3 to thereby superimpose the laser light transmitted through each of the microlenses 10; and the second lens 2 having the effective diameter larger than the effective diameter of the first lens 1 and for compensating for the divergence angle of the laser light expanded by each of the microlenses 10.

The above arrangement enables to perform beam shaping of laser light, uniform light intensity distribution from a central portion to an outer perimeter of laser light, and speckle noise reduction from the central portion to the outer perimeter of laser light. The effective diameter of the first lens 1 may be substantially the same as the diameter of an emission beam from the laser light source 3, e.g. several mm or less, and there is no need of expanding the beam diameter by a beam expander. This enables to make an optical system in the vicinity of the laser light source 3 advantageously compact, and a small light source area of the laser light source 3 can be effectively utilized.

A required length in the optical axis direction from the first lens 1 to the illumination plane 5 can be reduced by increasing the NA of the microlenses 10. For instance, in the case where an illumination plane 5 in the size of 10 mm×10 mm is illuminated, if the NA is 0.4, the optical axis length from the first lens 1 to the illumination plane 5 may be about 15 mm. Thus, the laser illuminating device 100 in this embodiment can be advantageously miniaturized, as compared with the conventional art. The laser illuminating device 100 in the first embodiment is operable to perform beam shaping by using light refraction, unlike a conventional fly-eye lens, wherein beam shaping is performed by light diffraction. Accordingly, the embodiment is advantageous in eliminating beam shaping deterioration or light intensity variation resulting from a change in wavelength, and is suitably used in the case where a laser illuminating device has a multi-wavelength laser light source.

The NA of the microlens 10 in the in-plane direction can be defined depending on an intended beam shape, as described above. The NA in the in-plane direction is defined by allowing a curvature of the microlens 10 to have a direction distribution, or changing the pitch of the microlenses 10 having the same curvature depending on a direction. In FIG. 4B, the first cylindrical lens portion 11a and the second cylindrical lens portion 11b intersecting with each other have the same pitch, in other words, the pitch d1 in the horizontal direction and the pitch d2 in the vertical direction are identical to each other. However, the first NA in the vertical direction and the second NA in the horizontal direction are defined by changing the curvature.

The pitch d1, d2 of the microlens 10 is smaller than the incident beam diameter, and laser light is incident into the microlenses 10 having the above arrangement. Preferably, the pitch d1, d2 of the microlens 10 is less than 1 mm at most in order to miniaturize the device. If the pitch d1, d2 is 1 mm or more, it is necessary to increase the size of the first lens 1 and the incident beam diameter, which obstructs miniaturization. In the first embodiment, the pitch d1, d2 of the microlens 10 is e.g. 200 μm. The shape of the microlens 10 is not limited to a spherical shape, but may be an aspherical shape depending on a distribution of NA. In particular, in the case where a large brightness is obtained on an outer perimeter of laser light, it is preferable to fabricate the microlens 10 into an aspherical shape.

Figure 5:
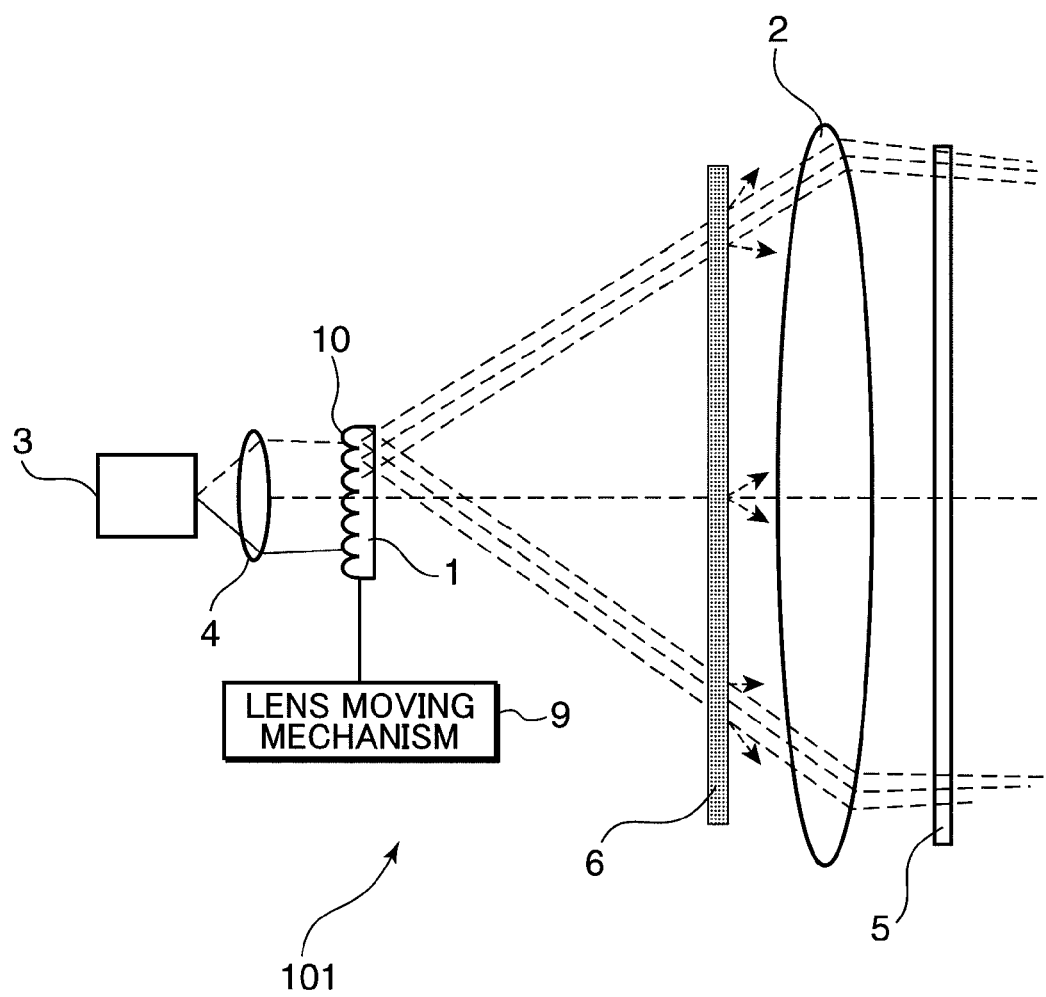
FIG. 5 is a schematic diagram showing an arrangement of a laser illuminating device as a modification of the first embodiment of the invention.

In the laser illuminating device of this embodiment, preferably, the first lens 1 has a lens moving mechanism for moving the first lens 1 in a plane direction perpendicular to the optical axis to further reduce speckle noise. FIG. 5 is a schematic diagram showing an arrangement of a laser illuminating device as a modification of the first embodiment of the invention.

A laser illuminating device 101 shown in FIG. 5 includes a first lens 1, a second lens 2, a laser light source 3, a collimator lens 4, a light diffuser 6, and a lens moving mechanism 9. Elements having the same arrangement as the corresponding elements in the laser illuminating device 100 shown in FIG. 1 are indicated with the same reference numerals as the corresponding elements, and description thereof is omitted herein.

In the modification of the first embodiment, the lens moving mechanism 9 two-dimensionally moves the first lens 1 in a plane direction perpendicular to the optical axis. Specifically, as shown in FIG. 4A, the first lens 1 is two-dimensionally moved with respect to two axes in a plane direction perpendicular to the optical axis. The lens moving mechanism 9 is constituted of a two-axis actuator, and a driver for driving the two-axis actuator. As shown by the arrow Y1 in FIG. 4A, the two-axis actuator oscillates the first lens 1 in the horizontal direction, and as shown by the arrow Y2 in FIG. 4A, the two-axis actuator oscillates the first lens 1 in the vertical direction.

The first lens 1 is held on the two-axis actuator, and is two-dimensionally oscillated in the in-plane direction. The focus positions of the respective microlenses 10 are changed by two-dimensionally oscillating the first lens 1 in the in-plane direction; and the focus positions are expanded in the in-plane direction by integrating a time required for moving the first lens 1. This means that the light source area is pseudo expanded by time integration. Thus, laser light interference can be lowered by increasing the light source area, and speckle noise as an interference noise can be further reduced.

In the case where an intensity variation of a beam to be incident into the first lens 1 is excessively large, or the number of microlenses 10 is as small as a few with respect to the incident beam diameter, the light intensity on the illumination plane 5 may be made non-uniform. However, the light intensity can be made uniform by oscillating the first lens 1 in the in-plane direction. In the first embodiment, it is possible to set the effective diameter of the first lens 1 to several mm or less. Thus, since the first lens 1 can be advantageously miniaturized, the lens moving mechanism 9 can be made compact and lightweight.

The lens moving mechanism 9 also provides a measure against damage in the case where the power density of a beam is high. Irradiation of laser light results in forming a light condensed point having an extremely large power density, and an optical component may be damaged by burning dusts or the like on or around the light condensed point. The laser illuminating device 101 as a modification of the first embodiment is miniaturized, and particularly, the first lens 1 has a small diameter. Accordingly, the power density may be increased. However, since the first lens 1 is oscillated by the lens moving mechanism 9, continuous concentration of laser power on a certain point is avoided, thereby preventing damage of an optical component. Even if an optical component is damaged, and the light use efficiency is lowered at a certain point, lowering of the light use efficiency can be suppressed, because a laser beam having a high power density is allowed to pass a site other than the damaged site by the lens moving mechanism 9.

The lens moving mechanism 9 two-dimensionally moves the first lens 1. Accordingly, in the modification of the first embodiment, the frequencies of the two axes to be moved are differentiated from each other. For instance, the first lens 1 is two-dimensionally moved within one second by moving the two axes with sinusoidal waves at 100 Hz and 111 Hz, respectively. In the case where the first lens 1 is one-dimensionally moved, or an oscillation suspending time of the first lens 1 is long, increasing the light source area by time integration cannot be sufficiently performed. In view of this, in the lens moving mechanism 9 for two-dimensionally moving the lens, preferably, the frequencies of the two axes to be moved may be differentiated from each other to satisfy a relation that the frequencies are not divisors of each other, or the oscillation frequencies may be modulated.

The axes to be moved are not limited to the two axes orthogonal to each other, as shown in FIG. 4A, but may be two axes i.e. a rotational axis parallel to the optical axis and a linear axis perpendicular to the optical axis, or a combination of rotational axes parallel to two decentered optical axes.

In the case where the lens moving mechanism 9 has the light diffuser 6, as shown in the modification of the first embodiment, the first lens 1 may be one-dimensionally moved in a plane direction perpendicular to the optical axis. In the modification, the focus positions of the microlenses 10 can be discretely differentiated and two-dimensionally changed by the light diffuser 6. Thus, one-dimensionally moving the first lens 1 also enables to obtain substantially the same effect as the arrangement of two-dimensionally moving the first lens 1. Further, it is preferable to set the oscillation frequency of the lens moving mechanism 9 one time or more of the repetition frequency of laser light emission. In the case where the oscillation frequency is low, a variation in brightness resulting from lens movement may be visually recognized. Further, in the case where the oscillation frequency is close to the repetition frequency of laser light emission, a change in brightness may be recognized as a change in frequency, and the image quality may be visually deteriorated.

Preferably, the maximum amplitude of the lens moving mechanism 9 is larger than the maximum pitch of the microlens 10 in the moving direction thereof. A pseudo increase in the light source area resulting from movement in the in-plane direction is proportional to the moving amplitude, and speckle noise is reduced accordingly. In the above arrangement, the light source area can be increased up to the size of the microlens 10, and in the case where the amplitude of the lens moving mechanism 9 is larger than the pitch of the microlens 10 in the moving direction thereof, the light source area is maximized. In this way, in the case where the maximum amplitude of the lens moving mechanism 9 is larger than the maximum pitch of the microlens 10 in the moving direction, the light source area is maximized. Further, the intensity distribution of a laser beam can be made uniform simultaneously with the above operation.

Oscillating the lens moving mechanism 9 in the in-plane direction with an amplitude larger than the pitch of the microlens 10 not only enables to remove speckle noise in a diffraction field of the illumination plane 5 but also enables to reduce speckle noise in an image field generated on the display plane (screen 8) in the case where the laser illuminating device is incorporated in an image display device. Increasing the light source area by the lens moving mechanism 9 enables to vary the angle of a laser beam impinged on the display plane, thereby generating a speckle pattern which is changed with time. The speckle pattern which is changed with time is subjected to time integration in the retina of a viewer, and noises are averaged, whereby speckle noise in the image field is reduced.

The laser illuminating device 100, 101 in the first embodiment has the light diffuser 6 on the laser light incident side of the second lens 2. In the first embodiment, the light diffuser 6 is disposed immediately in front of the second lens 2. Alternatively, the light diffuser 6 may be disposed between the first lens 1 and the second lens 2. Preferably, however, the light diffuser 6 is disposed immediately in front of the second lens 2 to increase the light receiving efficiency of light diffused by the light diffuser 6. Assuming that the distance between the first lens 1 and the second lens 2 is L, it is preferable to dispose the light diffuser 6 away from the second lens 2 by a distance equal to L/4 or smaller. In the case where the distance between the second lens 2 and the light diffuser 6 is larger than L/4, it is impossible to guide laser light from the second lens 2 to the illumination plane 5, and light amount loss is increased.

The light diffuser 6 may be disposed on the laser light incident surface of the second lens 2, which is a preferred mode free of light amount loss. For instance, the second lens 2 may be constituted of a flat convex lens, the flat plane side of the flat convex lens may be defined as the laser light incident side, and a diffusing surface may be formed on the flat plane side of the flat convex lens. In this arrangement, the light diffuser 6 on the laser light incident side of the second lens 2 enables to reduce speckle noise, and make the light intensity of laser beams uniform. The light diffuser 6 disposed immediately in front of the second lens 2 has an effective diameter substantially the same as the effective diameter of the illumination plane 5, and constitutes a diffusive light source having a sufficiently large size with respect to the illumination plane 5. Thereby, the size of speckle noise can be decreased, and speckle noise is reduced. Further, the light diffuser 6 as a diffusive light source enables to reduce a light intensity variation of incident laser light, and make the light intensity distribution of incident laser light uniform.

The light diffuser 6 disposed immediately in front of the second lens 2 enables to decrease the size of speckle noise in an image field, which is generated on the display plane, reduce the noise intensity of speckle noise in the image field, and reduce speckle noise in the image filed, not to mention speckle noise in a diffraction field, which is generated on the illumination plane 5.

The light diffuser 6 has an effect of removing large-sized speckle noise in a fixed state by simultaneously using the lens moving mechanism 9 for moving the first lens 1. In this arrangement, there is no need of moving the light diffuser 6. Although the light diffuser 6 is a large-sized component having substantially the same size as the illumination plane 5, the lens moving mechanism 9 can be constituted of a small-sized component having substantially the same size as the first lens 1. Accordingly, the laser illuminating device and the image display device can be made compact and lightweight. The light diffuser 6 may be an optical element having a diffusive surface such as a holographic diffuser surface, an abraded surface, or an embossed surface, all of which have a non-cyclic asperity pattern surface in the order of μm, or a diffusive plate containing particles having a refractive index different from the refractive index of a substrate. Further alternatively, a laser light incident surface of the second lens 2 may serve as a diffusive surface, as described above.

Preferably, the diffusing angle of laser light through the light diffuser 6 may be reduced toward an outer perimeter of laser light. In the case where the laser illuminating device 100 is incorporated in the image display device 110, the light receiving efficiency on the outer perimeter of the illumination plane 5 may be deteriorated resulting from shading of the projection lens 7. However, shading of the projection lens 7 can be compensated for by reducing the diffusing angle of laser light through the light diffuser 6 from the central portion toward the outer perimeter of laser light. In the first embodiment, the light diffuser 6 is a holographic diffuser whose diffusing angle is decreased, as the incident angle is increased. Alternatively, the surface processing of the light diffuser 6 may be changed from the central portion toward the outer perimeter of laser light in such a manner that the diffusing angle is reduced from the central portion toward the outer perimeter of laser light, without making the surface processing of the light diffuser 6 constant. For instance, the processing cycle of surface processing may be changed from the central portion toward the outer perimeter of laser light so that the pitch is concentrically increased.

In the image display device 110 shown in FIG. 3, the laser light source 3 has a CAN package with a diameter of 5.6 mm, the collimator lens 4 has a diameter of 4 mm, the first lens 1 has a diameter of 4 mm, the light diffuser 6 has a diameter of 15 mm, the second lens 2 has a diameter of 15 mm, the transmissive two-dimensional light modulator 5a has a diagonal length of 0.5 inch, and the projection lens 7 has a diameter of 18 mm. In this arrangement, a thumb-sized image display device 110 having the outer dimensions of 20 mm×60 mm can be realized. Thus, the laser illuminating device 100 and the image display device 110 can be miniaturized.

The image display device 110 has the collimator lens 4 for collimating laser light from the laser light source 3. Alternatively, an image forming lens for forming a light source image of the laser light source 3 on the central portion of the two-dimensional light modulator 5a may be disposed between the laser light source 3 and the first lens 1, in place of the collimator lens 4. In the case where the beam diameter in collimation is unduly large, the effective diameter of the first lens 1 may be excessively increased, and there occurs a drawback i.e. light amount loss resulting from an increase in the illumination area. In view of the above, use of an image forming lens for forming a light source image of the laser light source 3 on the central portion of the two-dimensional light modulator 5a enables to condense laser light at the central portion of the two-dimensional light modulator 5a, suppress an increase in the illumination area even with use of the first lens 1 having an increased effective diameter, and eliminate light amount loss and beam shaping deterioration.

The microlens 10 of the laser illuminating device 100 in the first embodiment may be constituted of a lens having a shape capable of easily defining the NA in the in-plane direction depending on the shape of the illumination plane 5, such as a rectangular lens, a circular lens, a conical lens, or a triangular lens, other than the arrangement that the microlens 10 is constituted of two cylindrical lens portions in directions orthogonal to each other on front and rear surfaces of the microlens, as shown in FIG. 4B. Preferably, the shape of the microlens 10 is a rectangle. Use of a rectangular shape enables to continuously fabricate the microlenses 10 of the first lens 1, thereby eliminating an unwanted space in the first lens 1, and eliminating light amount loss. Generally, the two-dimensional light modulator 5a has a rectangular shape having an aspect ratio of 3:4 or 9:16. Accordingly, it is preferable to form the microlens 10 into a rectangular shape in conformity with the shape of the two-dimensional light modulator 5a. In illuminating the rectangular two-dimensional light modulator 5a, preferably, the NA ratio of the microlens 10 between vertical and horizontal directions in the in-plane direction may be identical to the aspect ratio of the shape of the two-dimensional light modulator 5a. Beam shaping free of light amount loss can be performed by making the aspect ratio of the two-dimensional light modulator 5a identical to the NA ratio of the microlens 10 between vertical and horizontal directions.

Since the microlens 10 is a lens in the order of μm, it is difficult to mold the microlens or align the positions of the front and the rear surfaces of the microlens. In the case where the two-dimensional light modulator 5a is illuminated, as shown in FIG. 4B, it is preferable to fabricate the microlens 10 by arranging the first cylindrical lens portion 11a and the second cylindrical lens portion 11b having different NAs orthogonal to each other on the front and the rear surfaces of the microlens 10, to solve the problem relating to e.g. molding. Fabricating the microlens 10 into a cylindrical lens shape enables to easily fabricate a die for a spherical lens in the order of μm, and precisely design the lens shape (NA). In the modification, since the NAs of the microlenses 10 are made identical to each other, without aligning the positions of the front and the rear surfaces of the microlens 10, molding can be facilitated, and the productivity can be enhanced. It is preferable to integrally form first cylindrical lens portions 11a and second cylindrical lens portions 11b.

Further, in a microlens 10 having different NAs on the front and the rear surfaces thereof, it is preferable to define a surface having a larger NA as the laser light incident surface of the microlens 10. Specifically, it is preferable to set the NA of the first cylindrical lens portion 11a formed on the laser light incident surface of the microlens 10 larger than the NA of the second cylindrical lens portion 11b formed on the laser light exit surface thereof. Generally, an illumination plane (two-dimensional light modulator) has a longer length in the horizontal direction than the vertical direction. In view of this, the NA of the first cylindrical lens portion 11a on the light incident surface of the microlens 10 may be set to such a value that laser light is expanded in the horizontal direction, and the NA of the second cylindrical lens portion 11b on the light exit surface of the microlens 10 may be set to such a value that laser light is expanded in the vertical direction. Setting the NA of the first cylindrical lens portion 11a on the light incident surface of the microlens 10 larger than the NA of the second cylindrical lens portion 11b on the light exit surface of the microlens 10 enables to reduce spherical aberration, and perform precise beam shaping.

In FIG. 4B, two convex cylindrical lens portions are combined. The invention is not specifically limited to the above. Alternatively, two concave cylindrical lens portions may be combined, or a convex cylindrical lens portion and a concave cylindrical lens portion may be combined.

Figure 6:
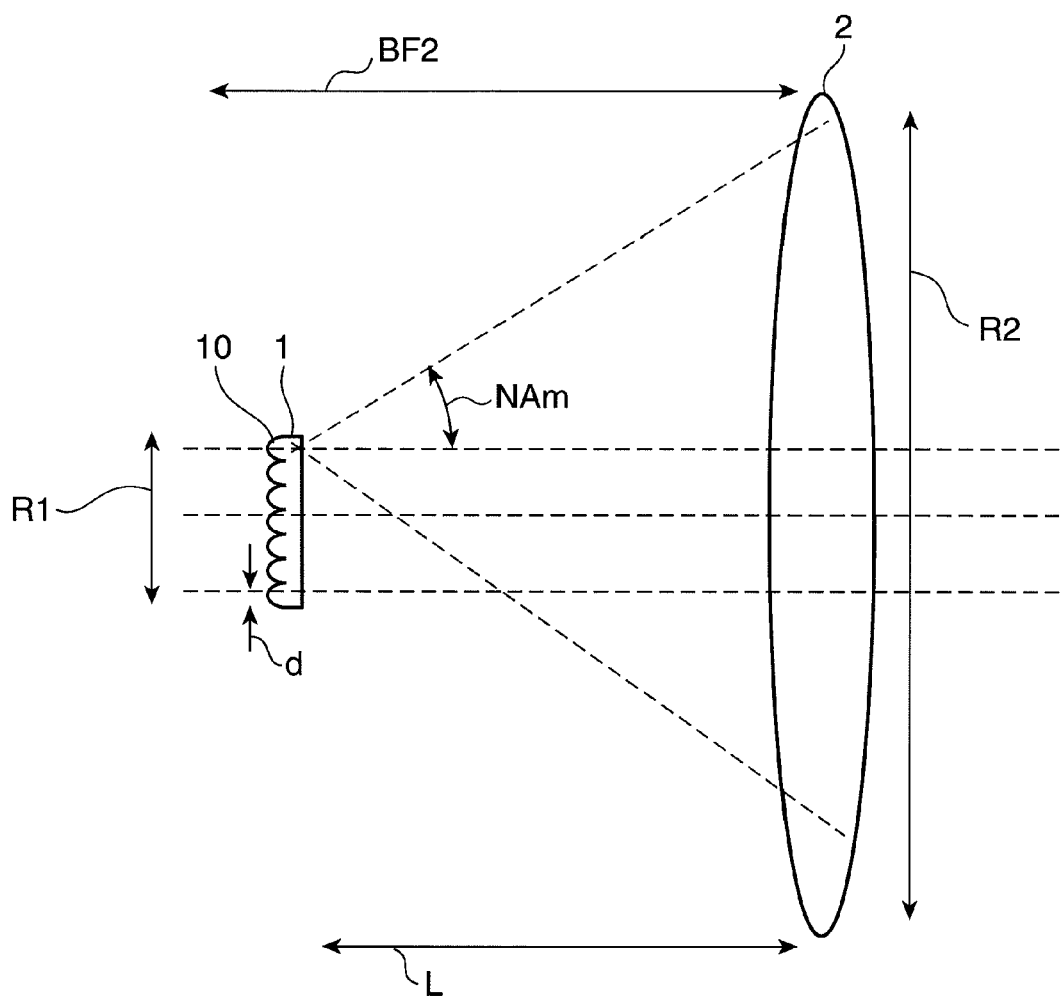
FIG. 6 is a diagram for describing arrangement positions of the first lens and a second lens.

FIG. 6 is a diagram for describing arrangement positions of the first lens 1 and the second lens 2. Let it be assumed that the distance between the first lens 1 and the second lens 2 is L, the effective diameter of the first lens 1 is R1, and the effective lens of the second lens 2 is R2. The effective diameter is a maximum effective diameter (beam diameter). Also, let it be assumed that the back focus distance of the second lens 2 is BF2, and the maximum numerical aperture of the microlens 10 is NAm. In this case, preferably, the first lens 1 and the second lens 2 in the first embodiment may satisfy the relations expressed by the formulas (1), (2), and (3).

$$L-R1/NAm<BF2<L+R1/NAm \quad (1)$$

$$R2>2\times R1 \quad (2)$$

$$R2<4\times L\times NAm \quad (3)$$

In the case where the back focus distance BF2 of the second lens 2 lies within the range defined in the formula (1), the second lens 2 is operable to compensate for a divergence angle of laser light expanded by the microlens 10, align laser beams on the central portion of laser light substantially parallel to each other, and inwardly bend an outer perimeter of a laser beam. Setting the back focus distance BF2 of the second lens 2 within the range defined in the formula (1) enables to perform uniform illumination and light transmission free of light amount loss. In the case where the back focus distance BF2 of the second lens 2 is longer than the range defined in the formula (1), it is impossible to compensate for the divergence angle of laser light through the microlens 10, the laser beams are scattered, and light amount loss is increased. On the other hand, in the case where the back focus distance BF2 of the second lens 2 is shorter than the range defined in the formula (1), an outer perimeter of a laser beam is exceedingly inwardly bent. Thereby, a luminance on the outer perimeter of the illumination plane 5 becomes higher than the central portion of the illumination plane 5, which makes the light intensity distribution on the illumination plane 5 non-uniform, and the shape of a beam to be formed by the microlens 10 is deformed into a circular shape.

The effective diameter R2 of the second lens 2 in the laser illuminating device 100 in the first embodiment is substantially the same as the size of the illumination plane 5. However, as far as the effective diameter R1 of the first lens 1 lies within the range defined in the formula (2), and equals to a half of the effective diameter R2 of the second lens 2, or less, the laser illuminating device 100 can be sufficiently miniaturized. Further, laser light expanded by the microlenses 10 can be superimposed on the second lens 2 by causing the effective diameter R2 of the second lens 2 and the maximum numerical aperture NAm of the microlens 10 to satisfy the range defined in the formula (3). Thereby, the light intensity of laser beams can be made uniform.

As described above, arranging the first lens 1 and the second lens 2 at such positions that satisfy the relations expressed by the formulas (1), (2), and (3) enables to make the light intensity of laser beams uniform, miniaturize the device, and obtain efficient illumination performance.

In the first embodiment, the distance L between the first lens 1 and the second lens 2 is set to 15 mm, the effective diameter R1 of the first lens 1 is set to 2 mm, the effective diameter R2 of the second lens 2 is set to 14 mm, the back focus distance BF2 of the second lens 2 is set to 16.6 mm, the maximum numerical aperture NAm of the microlens 10 is set to 0.33, and the first lens 1 and the second lens 2 are disposed at such positions that satisfy the relations expressed by the formulas (1), (2), and (3), whereby the illumination plane 5 is uniformly illuminated with a rectangular illumination area having the aspect ratio of 3:4.

Preferably, the maximum numerical aperture NAm of the microlens 10 is larger than 0.2 to miniaturize an optical system. Setting the maximum numerical aperture NAm of the microlens 10 larger than 0.2 enables to uniformly illuminate the illumination plane 5, with a reduced distance between the first lens 1 and the second lens 2.

(Second Embodiment)

Figure 7:
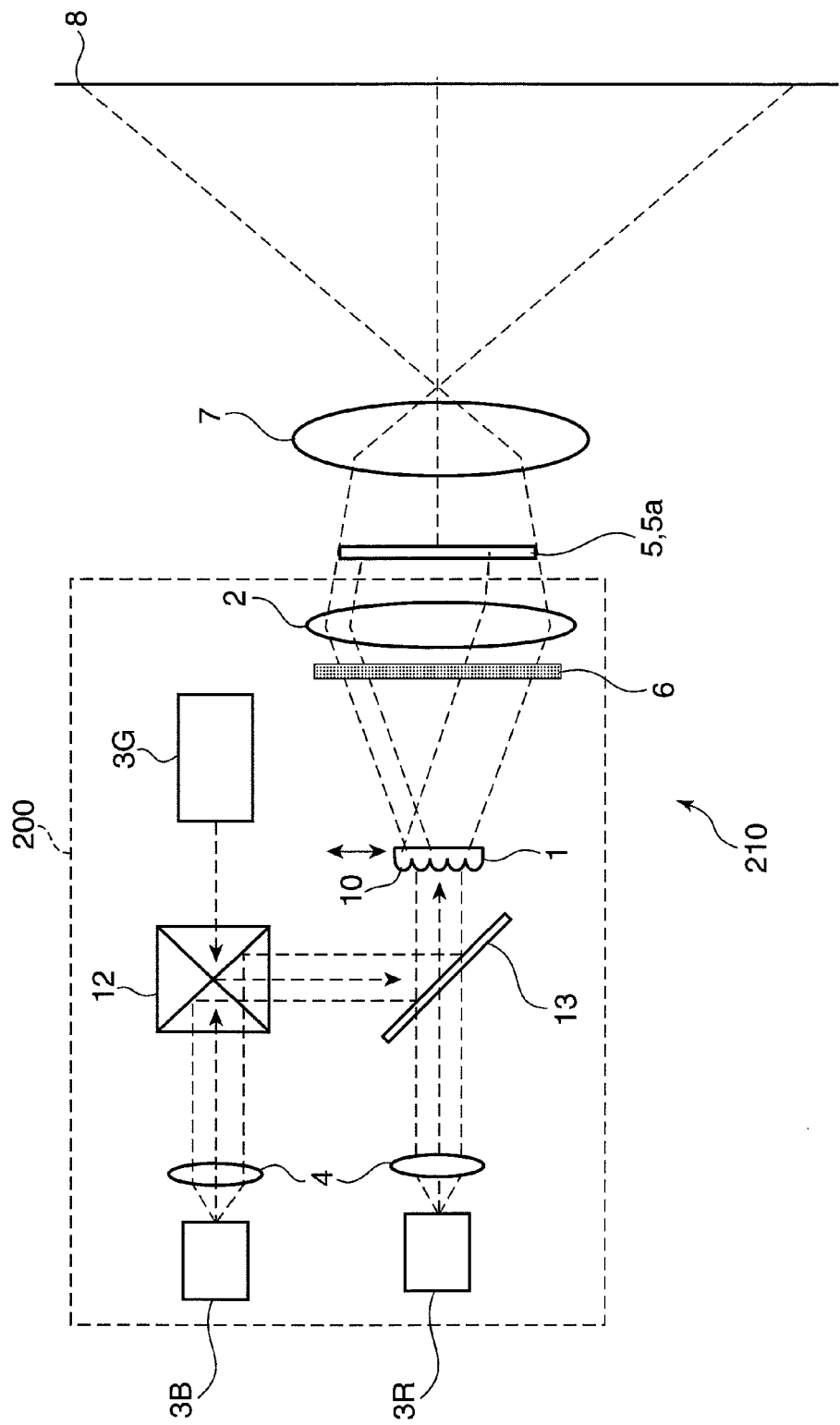
FIG. 7 is a schematic diagram showing an arrangement of a color image display device in the second embodiment of the invention.

FIG. 7 is a schematic diagram showing an arrangement of a color image display device 210 in the second embodiment of the invention. The color image display device 210 in the second embodiment includes a color laser illuminating device 200 incorporated with a 3-wavelength laser light source. Elements having the same arrangement as the corresponding elements in the first embodiment are indicated with the same reference numerals as the corresponding elements, and description thereof is omitted herein.

The color image display device 210 includes the color laser illuminating device 200, a two-dimensional light modulator 5a, a projection lens 7, and a screen 8. The color laser illuminating device 200 includes a first lens 1, a second lens 2, laser light sources 3R, 3G, and 3B, a collimator lens 4, a light diffuser 6, a cross prism 12, and a dichroic mirror 13.

The laser light source 3R is a red semiconductor laser for emitting red laser light. The laser light source 3G is a green SHG (Second Harmonic Generation) laser for emitting green laser light. The laser light source 3B is a blue semiconductor laser for emitting blue laser light. The laser light emitted from the laser light source 3R and the laser light emitted from the laser light source 3B are collimated by the collimator lens 4 in the similar manner as the first embodiment. The green SHG laser is incorporated with a wavelength conversion laser made of a non-linear crystal, and outputs laser light having a small divergence angle.

Green laser light emitted from the laser light source 3G is incident into the cross prism 12. The cross prism 12 reflects the green laser light emitted from the laser light source 3G toward the dichroic mirror 13. Blue laser light emitted from the laser light source 3B and converted into parallel light by the collimator lens 4 is incident into the cross prism 12. The cross prism 12 reflects the blue laser light emitted from the laser light source 3B toward the dichroic prism 13. Then, the cross prism 12 combines the blue laser light and the green laser light.

After the green laser light emitted from the laser light source 3G and the blue laser light emitted from the laser light source 3B are combined by the cross prism 12, the combined light is incident into the dichroic mirror 13. Red laser light emitted from the laser light source 3R and converted into parallel light by the collimator lens 4 is incident into the dichroic mirror 13. The dichroic mirror 13 transmits the red laser light toward the first lens 1, and reflects the blue laser light and the green laser light toward the first lens 1. Then, the dichroic mirror 13 combines the red laser light, the blue laser light, and the green laser light. In this way, the laser light having the three different wavelengths is coaxially aligned for incidence into the first lens 1. Since the arrangement after the first lens 1 in the second embodiment is identical to the arrangement after the first lens 1 in the first embodiment, description thereof is omitted herein.

The laser illuminating device 200 in the second embodiment is provided with the laser light sources 3R, 3G, and 3B for emitting red laser light, green laser light, and blue laser light of three different wavelengths. Coaxially aligning the laser light emitted from the laser light sources 3R, 3G, and 3B enables to realize beam shaping, uniform illumination, speckle noise removal, miniaturization of the device, and color image display, with use of a set of the first lens 1 and the second lens 2. The first lens 1 and the second lens 2 in the second embodiment are operable to realize beam shaping, uniform illumination, and speckle noise removal, without depending on the beam diameter or the wavelength of incident laser light. Accordingly, a color image using laser light sources can be displayed by using the compact color laser illuminating device 200. Further, coaxially aligning laser light emitted from the laser light sources enables to uniformly illuminate an illumination plane 5 (two-dimensional light modulator 5a), without depending on the wavelengths of the laser light sources.

Preferably, the color laser illuminating device 200 and the color image display device 210 in the second embodiment satisfy the relations expressed by the following formulas (4) and (5), wherein λl is the longest wavelength to be used in the laser light sources, λs is the shortest wavelength to be used in the laser light sources, R1 is the maximum effective diameter of the first lens 1, and d is the minimum pitch of the microlens 10.

$$d > 10 \times (\lambda l - \lambda s) \tag{4}$$

$$d < R1/3 \tag{5}$$

In the second embodiment, use of the microlens 10 in the order of μm may generate diffractive chromatic aberration, and cause color variation or light amount loss on the outer perimeter of the illumination plane 5. This is a problem to be solved in the miniaturized color laser illuminating device 200 and the miniaturized color image display device 210. In the embodiment, causing the longest wavelength λl, the shortest wavelength λs, and the minimum pitch d of the microlens 10 to satisfy the relation expressed by the formula (4) enables to suppress diffractive chromatic aberration, and suppress beam shaping deterioration of the respective colors on the illumination plane 5 (two-dimensional light modulator 5a), even with use of a multi-color laser light source. In particular, causing the longest wavelength λl, the shortest wavelength λs, and the minimum pitch d of the microlens 10, which may increase chromatic aberration, to satisfy the relation expressed by the formula (4) enables to solve a problem resulting from an increase in the number of use wavelengths.

The minimum pitch d of the microlens 10 satisfies the relation expressed by the formula (5), and the number of microlenses is set to the number more than at least three with respect to the effective diameter R1 of the first lens 1. In the case where the number of microlenses is three or less, decentering of the microlens 10 with respect to an incident beam may obstruct uniform light intensity distribution of laser beams. In particular, in the case where a plurality of laser light sources (multi-wavelength laser light source) are used, if the minimum pitch d of the microlens 10 and the maximum effective diameter R1 of the first lens 1 do not satisfy the relation expressed by the formula (5), the device may be affected by a variation with respect to each of the laser light sources, or adjustment precision. This may impair the feature of combination of the first lens 1 and the second lens 2 i.e. beam shaping, uniform illumination, and speckle noise removal, without depending on the beam diameter or the wavelength of incident laser light. In view of the above, causing the minimum pitch d of the microlens 10 to satisfy the relation expressed by the formula (5) enables to sufficiently exhibit the function of the invention.

Preferably, the color laser illuminating device 200 in the second embodiment satisfies the relation expressed by the following formula (6), wherein λl is the longest wavelength to be used in the laser light sources, λs is the shortest wavelength to be used in the laser light sources, and d is the minimum pitch of the microlens 10.

$$100 \times (\lambda l - \lambda s) < d < 2000 \times (\lambda l - \lambda s) \tag{6}$$

Since the microlens 10 is very small, it is difficult to compensate for chromatic aberration due to chromatic dispersion by using e.g. a doublet lens. In the color laser illuminating device 200 in the second embodiment, it is preferable to compensate for the chromatic aberration due to chromatic dispersion by diffractive chromatic aberration. In the case where the minimum pitch d of the microlens 10 satisfies the relation expressed by the formula (6), chromatic aberration due to chromatic dispersion can be compensated for by diffractive chromatic aberration. As expressed by the formula (6), in the case where the minimum pitch d of the microlens 10 is equal to or smaller than the value of $(100 \times (\lambda l - \lambda s))$, chromatic aberration by diffraction is increased. On the other hand, in the case where the minimum pitch d of the microlens 10 is equal to or larger than the value of $(2000 \times (\lambda l - \lambda s))$, chromatic aberration due to chromatic dispersion is increased. In view of this, causing the minimum pitch d of the microlens 10 to satisfy the relation expressed by the formula (6) enables to obtain the function of the invention, by a compact arrangement i.e. a set of the first lens 1 and the second lens 2, even with use of a multi-wavelength laser light source.

In the second embodiment, 640 nm-wavelength of red laser light to be emitted from the laser light source 3R is used as the longest wavelength $\lambda l$, 445 nm-wavelength of blue laser light to be emitted from the laser light source 3B is used as the shortest wavelength $\lambda s$, the minimum pitch d of the microlens 10 is set to 120 μm, the effective diameter R1 of the first lens 1 is set to 2 mm, and the first lens 1 and the second lens 2 are disposed at such positions that satisfy the relations expressed by the formulas (4), (5), and (6). Thereby, beam shaping, uniform illumination, speckle noise removal, and miniaturization of the color laser illuminating device 200 and the color image display device 210 can be realized in displaying a color image.

(Third Embodiment)

Figure 8A:
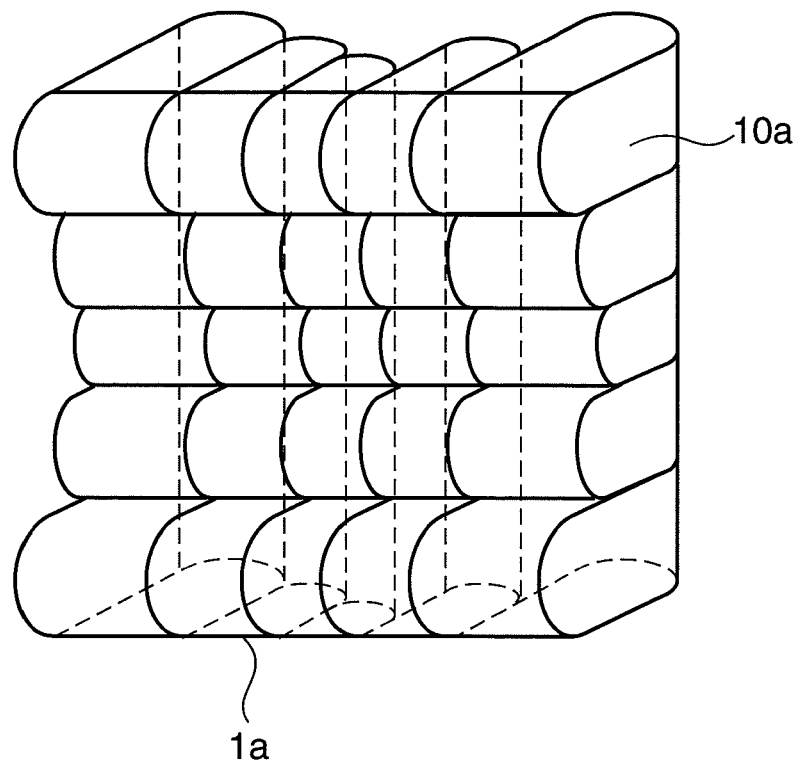
FIG. 8A is an enlarged view showing a first lens in the third embodiment of the invention.
Figure 8B:
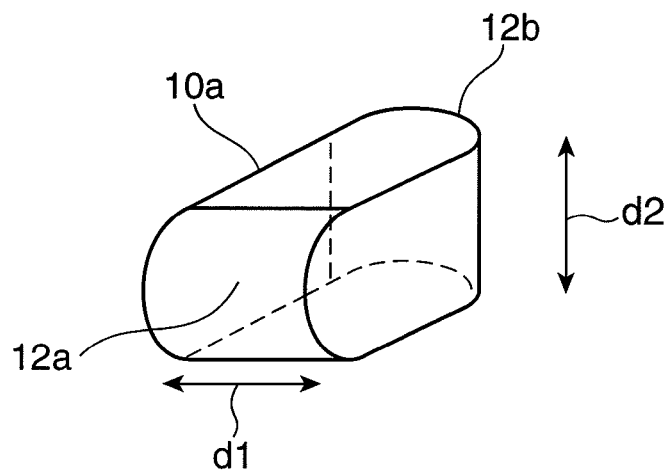
FIG. 8B is an enlarged view showing one of microlenses in FIG. 8A.

In this section, a laser illuminating device in the third embodiment is described. The laser illuminating device in the third embodiment is different from the laser illuminating device in the first embodiment solely in the arrangement of the first lens. Accordingly, in the following, solely the first lens 1 is described. FIG. 8A is an enlarged view showing a first lens in the third embodiment of the invention, and FIG. 8B is an enlarged view showing one of microlenses shown in FIG. 8A.

A first lens 1a in the third embodiment is constituted of microlenses 10a having different pitches. The respective microlenses 10a have a predetermined identical NA in the in-plane direction. Each of the microlenses 10a in the third embodiment includes a first cylindrical lens portion 12a which is formed in a horizontal direction on the laser light incident side of the microlens 10a, with a first NA; and a second cylindrical lens portion 12b which is formed in a vertical direction on the laser light exit side of the microlens 10a, with a second NA different from the first NA. All the microlenses 10a have the first NA in the vertical direction and the second NA in the horizontal direction, and have different curvature radiuses depending on the pitches of the first cylindrical lens portion 12a and the second cylindrical lens portion 12b. All the microlenses 10a have an identical NA.

The microlenses 10a adjacent to each other in the horizontal direction have different pitches d1 in the horizontal direction, and identical pitches d2 in the vertical direction. The microlenses 10a adjacent to each other in the vertical direction have identical pitches d1 in the horizontal direction, and different pitches d2 in the vertical direction. In other words, each one of the microlenses has a lens diameter different from the lens diameter of the other microlenses adjacent around the each one microlens.

The first lens 1a in the third embodiment has the microlenses 10a. The respective microlenses 10a have the predetermined NA in the in-plane direction, and at least one of the microlenses 10a has a lens diameter different from the lens diameter of the other microlenses 10a. Differentiating the lens diameter of at least one of the microlenses 10a from the lens diameter of the other microlenses 10a enables to eliminate forming a diffraction pattern of laser light, which is generated in using microlenses having an identical lens diameter. In the case where the lens diameters of microlenses 10a are made identical to each other, a wavelength-dependent light intensity distribution or an unwanted light intensity pattern may be generated on an illumination plane 5 by diffraction, because the microlenses 10a are fabricated in the order of μm, and laser is used as a light source. The third embodiment is advantageous in eliminating an adverse effect of diffraction on the illumination plane 5 by laser light and microlenses 10.

As shown in FIGS. 8A and 8B, constituting each of the microlens 10a of the first cylindrical lens portion 12a and the second cylindrical lens portion 12b orthogonal to each other enables to efficiently perform fabrication and molding of a die for the microlenses 10a in the third embodiment, wherein two-dimensional NAs in the in-plane direction are made identical to each other by differentiating the pitches.

(Fourth Embodiment)

In this section, a laser illuminating device in the fourth embodiment is described. The laser illuminating device in the fourth embodiment is different from the laser illuminating device in the first embodiment solely in the arrangement of the first lens. Accordingly, in the following, solely the first lens 1 is described. FIG. 9A is an enlarged view showing a first lens in the fourth embodiment of the invention, FIG. 9B is an enlarged view showing a microlens constituted of a convex cylindrical lens portion and a convex cylindrical lens portion, and FIG. 9C is an enlarged view showing a microlens constituted of a concave cylindrical lens portion and a concave cylindrical lens portion.

A first lens 1b in the fourth embodiment includes microlenses 10b. Each of the microlenses 10b has a first cylindrical lens portion 13a which is formed in a horizontal direction on the laser light incident side of the microlens 10b, with a first NA; and a second cylindrical lens portion 13b which is formed in a vertical direction on the laser light exit side of the microlens 10b, with a second NA different from the first NA.

The first cylindrical lens portion 13a has a convex cylindrical lens portion 14a with a curved surface protruding toward the laser light incident side, and a concave cylindrical lens portion 14b with a curved surface protruding toward the laser light exit side. The second cylindrical lens portion 13b has a convex cylindrical lens portion 15a with a curved surface protruding toward the laser light exit side, and a concave cylindrical lens portion 15b with a curved surface protruding toward the laser light incident side.

The first lens 1b is constituted of a plurality of the first cylindrical lens portions 13a whose convex surfaces and concave surfaces are alternately and sequentially arranged in the vertical direction, and a plurality of the second cylindrical lens portions 13b whose convex surfaces and concave surfaces are alternately and sequentially arranged in the horizontal direction.

The microlens 10b includes microlenses 101, 102, 103, and 104 of four patterns, each of which is formed depending on combination of convex and concave surfaces. The microlens 101 is constituted of the convex cylindrical lens portion 14a and the convex cylindrical lens portion 15a. The microlens 102 is constituted of the convex cylindrical lens portion 14a and the concave cylindrical lens portion 15b. The microlens 103 is constituted of the concave cylindrical lens portion 14b and the convex cylindrical lens portion 15a. The microlens 104 is constituted of the concave cylindrical lens portion 14b and the concave cylindrical lens portion 15b.

The diffusing direction of laser light through the convex cylindrical lens portion 14a and the concave cylindrical lens portion 14b formed on the incident surface of the microlens, and the diffusing direction of laser light through the convex cylindrical lens portion 15a and the concave cylindrical lens portion 15b formed on the exit surface of the microlens are orthogonal to each other.

FIG. 9B shows the microlens 101 constituted of a convex cylindrical lens portion and a convex cylindrical lens portion. FIG. 9C shows the microlens 104 constituted of a concave cylindrical lens portion and a concave cylindrical lens portion. The convex cylindrical lens portion 14a and the concave cylindrical lens portion 14b have a predetermined identical NA in the in-plane direction. Likewise, the convex cylindrical lens portion 15a and the concave cylindrical lens portion 15b have a predetermined identical NA in the in-plane direction. The microlens 13a has the first NA in the vertical direction and the second NA in the horizontal direction, and exhibits the function of beam shaping, uniform light intensity, and speckle noise reduction.

Alternatively, each of the microlenses 13a may include a convex lens portion, and a concave lens portion having the same numerical aperture as the numerical aperture of the convex lens portion, wherein the convex lens portions and the concave lens portions may be alternately and sequentially arranged in the in-plane direction.

The first lens 1b is configured in such a manner that the convex lens portions and the concave lens portions having the identical NAs are alternately and sequentially arranged in the first direction on the light incident surface of the first lens 1b or the light exit surface of the first lens 1b; and the convex lens portions or the concave lens portions having the identical NAs are sequentially arranged in the second direction perpendicularly intersecting with the first direction on the light incident surface of the first lens 1b or the light exit surface of the first lens 1b. As the NA of the microlens 10b is increased, the device can be miniaturized. However, in increasing the NA, in the case where the microlenses 10b are constituted solely of the convex cylindrical lens portions, connecting portions between the adjacent microlenses 10b are formed into a valley-like shape, which may obstruct molding.

In the fourth embodiment, however, alternately arranging the concave cylindrical lens portions and the convex cylindrical lens portions enables to make connecting portions between the microlenses 10b smooth, thereby facilitating molding. Thus, molding into a precise shape can be realized, while increasing the NA, and the productivity can also be enhanced.

In the fourth embodiment, use of the convex cylindrical lens portion and the concave cylindrical lens portion having the identical NAs enables to displace the focal planes of the microlenses 10b from each other in the optical axis direction. Thereby, patterns of laser beams to be superimposed through the microlenses 10b are differentiated in the optical axis direction, and speckle noise can be further reduced.

Further, arranging the cylindrical lens portions on the laser light incident side of the microlenses, and the cylindrical lens portions on the laser light exit side of the microlenses orthogonal to each other, as shown by the first lens 1b, enables to efficiently perform fabrication and molding of a die for the microlenses 10b, wherein the concave surfaces and the convex surfaces having a predetermined NA in the two-dimensional direction are alternately and sequentially formed.

(Fifth Embodiment)

Figure 10A:
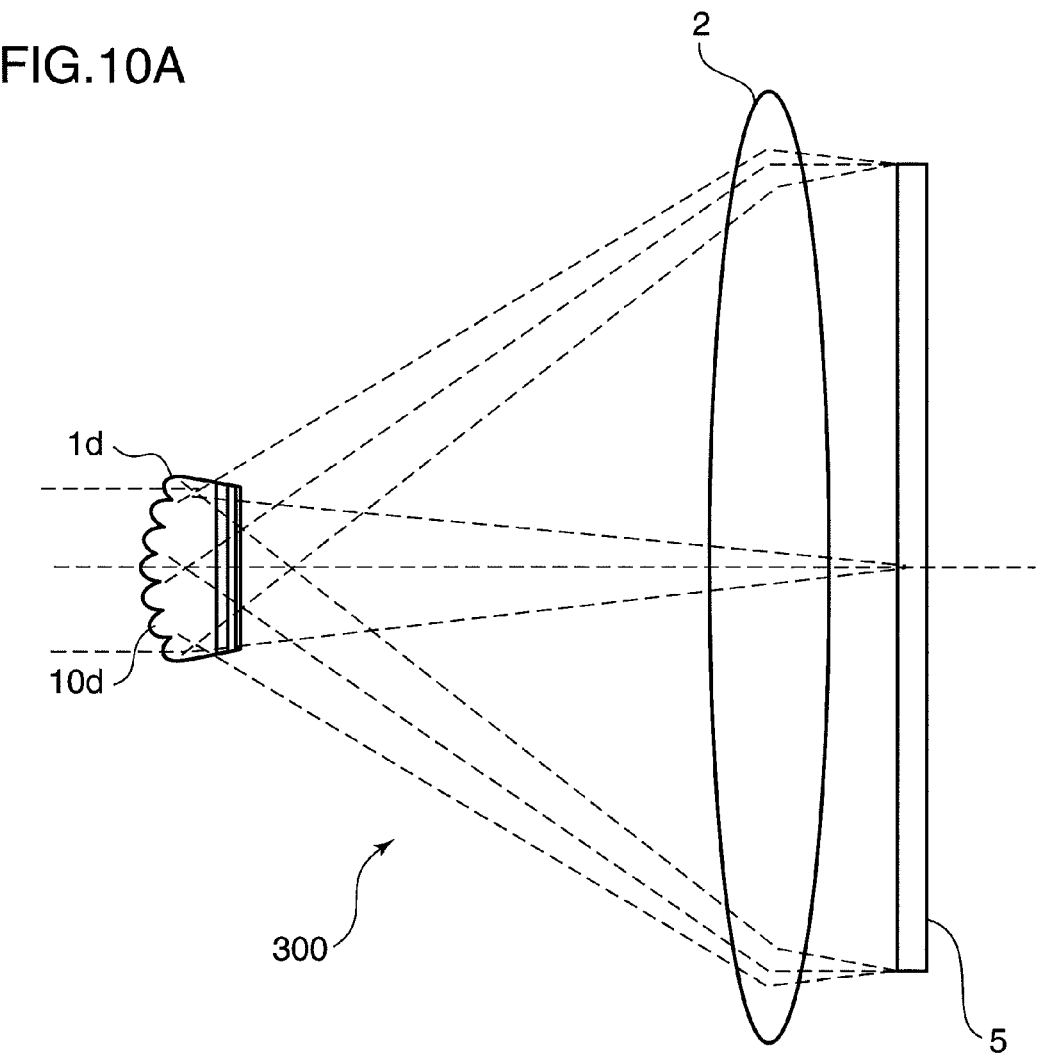
FIG. 10A is a schematic diagram showing an arrangement of a laser illuminating device in the fifth embodiment of the invention.
Figure 10B:
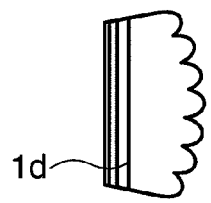
FIG. 10B is a schematic sectional view showing a state that a first lens in FIG. 10A is rotated by 90 degrees about an optical axis.

FIG. 10A is a schematic diagram showing an arrangement of a laser illuminating device 300 in the fifth embodiment of the invention. FIG. 10B is a schematic sectional view showing a state that a first lens in FIG. 10A is rotated about an optical axis by 90 degrees. Elements having the same arrangement as the corresponding elements in the first embodiment are indicated with the same reference numerals as the corresponding elements, and description thereof is omitted herein. The laser illuminating device 300 shown in FIG. 10A includes a first lens 1d, a second lens 2, a laser light source 3, a collimator lens 4, and a light diffuser 6. In FIG. 10A, a laser light source 3, a collimator lens 4, and a light diffuser 6 are omitted.

The first lens 1d in the fifth embodiment includes microlenses 10d. The microlenses 10d are arranged at such positions that each of the microlenses 10d is increasingly tilted with respect to the optical axis, as the microlens 10d is distanced from the optical axis. Specifically, the angle of the central axis of each of the microlenses 10d with respect to the optical axis of the first lens 1d is increased, as the microlens 10d is distanced from the optical axis of the first lens 1d.

Laser light is incident into the first lens 1d with an increasing angle with respect to the optical axis, as the microlens 10d is distanced from the optical axis. The laser light is expanded while being subjected to superimposition depending on a predetermined NA of the microlenses 10d of the first lens 1d, and illuminates an illumination plane 5 in a state that the divergence angle of laser light through the microlenses 10d is compensated for by the second lens 2. Arranging the microlenses 10d of the first lens 1d at predetermined angles with respect to the optical axis enables to condense principal beams through all the microlenses 10d on a central portion of the illumination plane 5.

Specifically, the first lens 1d includes the microlenses 10d. The shape of each of the microlenses 10d is changed, as the microlens 10d is distanced from the optical axis of laser light. The first lens 1d as a whole has a lens function of condensing laser light on the central portion of the illumination plane 5.

The respective microlenses 10d have a predetermined identical NA in the in-plane direction. Each of the microlenses 10d in the fifth embodiment includes a first cylindrical lens portion which is formed in a horizontal direction on the laser light incident surface of the microlens 10d, with a first NA; and a second cylindrical lens portion which is formed in a vertical direction on the laser light exit surface of the microlens 10d, with a second NA different from the first NA. The first cylindrical lens portion has such a shape that the angle thereof with respect to the optical axis of laser light is increased, as the first cylindrical lens portion is distanced from the optical axis. Similarly, the second cylindrical lens portion has such a shape that the angle thereof with respect to the optical axis of laser light is increased, as the second cylindrical lens portion is distanced from the optical axis.

For instance, in the first embodiment, in the case where a plurality of laser light sources are used, displacement of an incident position of laser light from the respective laser light sources into the first lens 1 may cause light intensity variation and beam shaping deterioration on the illumination plane 5. Further, in the first embodiment, in the case where the effective diameter of the first lens 1 is increased, the light intensity on an outer perimeter on the illumination plane 5 may be lowered, or light amount loss may occur resulting from an increase in the illumination area. On the other hand, in the fifth embodiment, since the first lens 1 is operable to condense laser light on the central portion of the illumination plane 5, the aforementioned drawbacks can be eliminated, even if a plurality of laser light sources are used, or the effective diameter of the first lens 1d is unduly large. In particular, the fifth embodiment is suitable in using a plurality of laser light sources for emitting multi-wavelength light (red, green, and blue light).

Further, since the first lens 1d as a whole has a lens function, laser light through the microlenses 10d can be superimposed on the central portion of the illumination plane 5, without depending on the incident position of laser light into the first lens 1d, or the radius of the first lens 1d. Superimposing laser light on the central portion of the illumination plane 5, and performing beam shaping enables to eliminate light amount loss in the vicinity of the illumination plane 5, and eliminate light intensity variation on the illumination plane 5 and light intensity lowering on the outer perimeter of the illumination plane 5, whereby the illumination plane 5 can be uniformly illuminated. Further, superimposing laser light through the microlenses 10d on the outer perimeter of the illumination plane 5, as well as the central portion of the illumination plane 5, enables to reduce speckle noise.

Figure 11A:
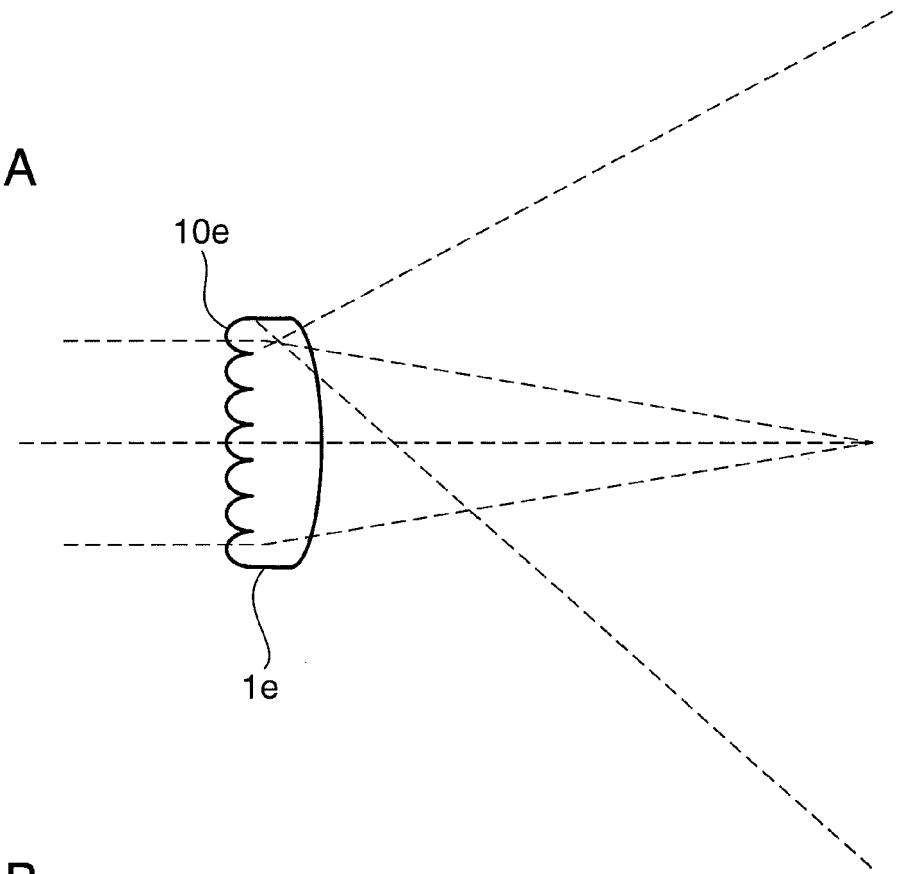
FIG. 11A is a schematic diagram showing a first lens as a modification of the filth embodiment of the invention.
Figure 11B:
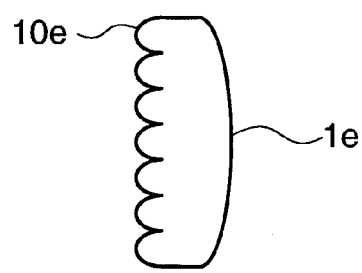
FIG. 11B is a schematic sectional view showing a state that the first lens in FIG. 11A is rotated by 90 degrees about an optical axis.

Next, a first lens as a modification of the fifth embodiment is described. FIG. 11A is a schematic diagram showing a first lens as a modification of the fifth embodiment of the invention, and FIG. 11B is a schematic sectional view showing a state that the first lens shown in FIG. 11A is rotated about the optical axis by 90 degrees.

A first lens 1e as the modification of the fifth embodiment includes microlenses 10e. Each of the microlenses 10e is formed into a spherical lens portion of a rectangular shape on the laser light incident surface of the microlens 10e, and is formed into a convex lens portion with a convex surface as a whole on the laser light exit surface of the microlens 10e. The shape of the laser light incident surface of the microlens 10e is unchanged, without depending on the distance of the microlens 10e from the optical axis, but the shape of the laser light exit surface of the microlens 10e is changed, as the microlens 10e is distanced from the optical axis.

The respective microlenses 10e have a predetermined identical NA in the in-plane direction. Each of the microlenses 10e as the modification of the fifth embodiment has a convex lens portion on the laser light incident surface of the microlens 10e, and a part of a convex lens portion on the laser light exit surface of the microlens 10e.

The first lens 1e as a whole has a lens function by the convex lens configuration on the laser light exit surface thereof, and principal beams through all the microlenses 10e are condensed on the central portion of the illumination plane 5. Similarly to the first lens 1d in the fifth embodiment, the first lens 1e as the modification of the fifth embodiment enables to solve the problem in the fifth embodiment by superimposing laser light through the microlenses 10e on the central portion of the illumination plane 5.

(Sixth Embodiment)

Figure 12:
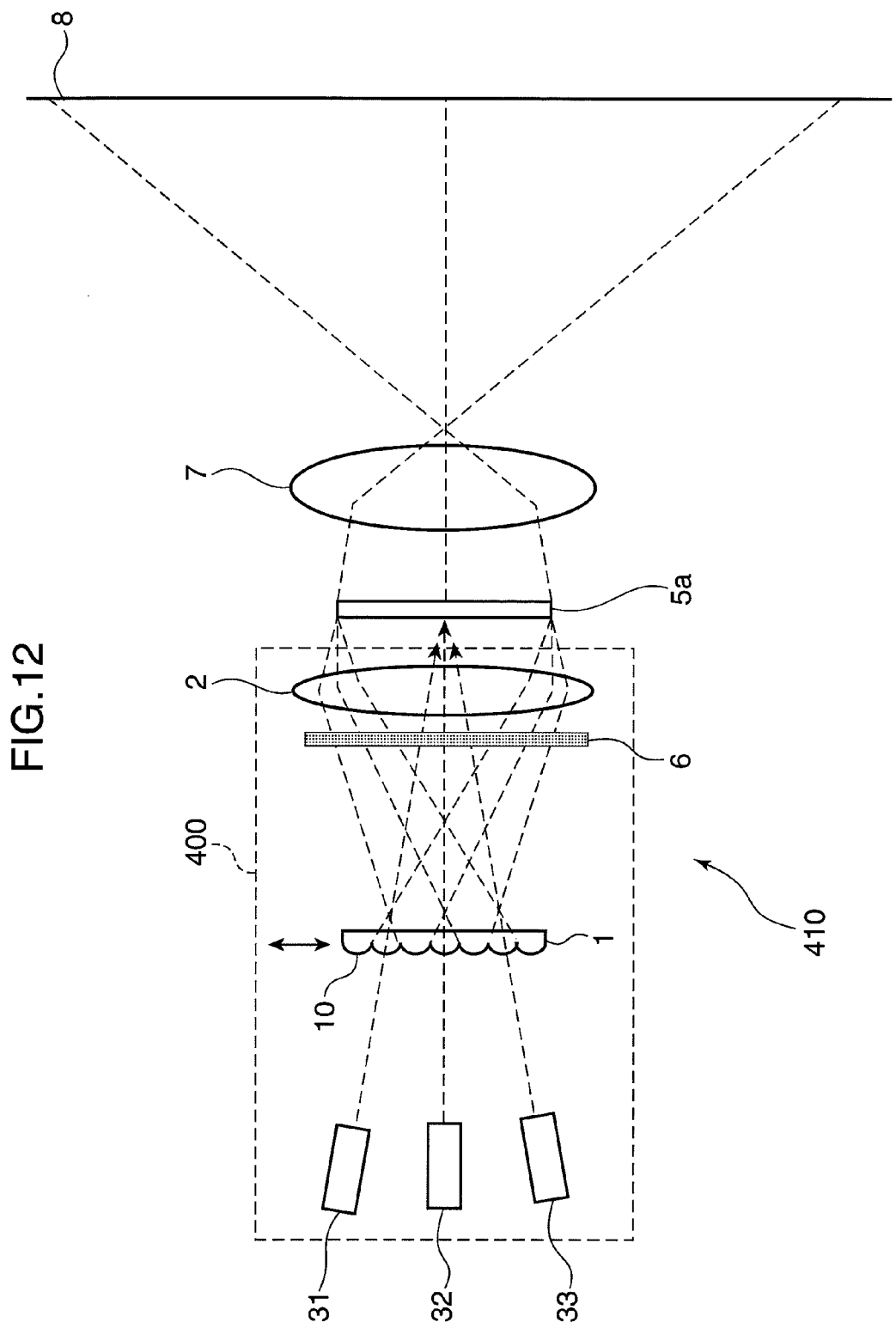
FIG. 12 is a schematic diagram showing an arrangement of an image display device in the sixth embodiment of the invention.

FIG. 12 is a schematic diagram showing an arrangement of an image display device 410 in the sixth embodiment of the invention. Elements having the same arrangement as the corresponding elements in the first embodiment are indicated with the same reference numerals as the corresponding elements, and description thereof is omitted herein. The image display device 410 in the sixth embodiment includes a laser illuminating device 400, a two-dimensional light modulator 5a, a projection lens 7, and a screen 8. The laser illuminating device 400 includes a first lens 1, a second lens 2, a light diffuser 6, and laser light sources 31, 32, and 33.

The laser light source 31 is a red semiconductor laser for emitting red laser light. The laser light source 32 is a green SHG laser for emitting green laser light. The laser light source 33 is a blue semiconductor laser for emitting blue laser light. The green SHG laser is incorporated with a wavelength conversion laser made of a non-linear crystal, and outputs laser light having a small divergence angle.

The laser light sources 31, 32, and 33 are disposed at such positions that principal beams of laser light emitted therefrom are transmitted through a central portion of the two-dimensional light modulator 5a as an illumination plane. In this example, the principal beams are defined solely based on the lens power of the first lens 1 as a whole, without considering the NA of microlenses 10 included in the first lens 1. In particular, principal beams of laser light from the laser light source 31 and the laser light source 33 are tilted with respect to the light incident surface of the first lens 1. Similarly to the first embodiment, laser light from the laser light source 32 illuminates the two-dimensional light modulator 5a.

Laser light from the laser light source 31 and the laser light source 33 is incident with a certain angle into the first lens 1, and is subjected to beam shaping by the predetermined NA of the microlenses. Laser light expanded by the microlenses 10 of the first lens 1 has its divergence angle compensated for by the second lens 2, and illuminates the two-dimensional light modulator 5a. In the illumination, transmission of the principal beams from the laser light sources 31, 32, and 33 through the central portion of the two-dimensional light modulator 5a enables to perform proper beam shaping on the central portion of the two-dimensional light modulator 5a as an illumination plane, and make the light intensity distribution uniform.

In the case where a plurality of laser light sources are used, displacement of an incident position of laser light from the respective laser light sources into the first lens 1 may cause light intensity variation and beam shaping deterioration on the illumination plane. Further, an optical component such as a dichroic mirror is necessary to coaxially align laser light from the laser light sources. This impairs the cost reduction and miniaturization.

On the other hand, the sixth embodiment is advantageous in solving the problem resulting from using a plurality of laser light sources. Transmission of principal beams of all the laser light through the central portion of the two-dimensional light modulator 5a enables to realize beam shaping depending on the NA of the microlenses 10 on the central portion of the two-dimensional light modulator 5a, without depending on the laser light sources, make the light intensity distribution uniform, and eliminate light amount loss resulting from beam shaping deterioration.

Since principal beams of laser light are incident with a certain angle with respect to the light incident surface of the first lens 1, the focus positions of the microlenses 10 can be discretely differentiated, and speckle noise can be reduced. Further, in the sixth embodiment, the latitude in arrangement position of the laser light sources is increased, despite use of the laser light sources. Furthermore, in the case where a color image with high luminance is displayed on an image display device by using 3-wavelength laser light of red, green, and blue to be emitted from the laser light sources, the device can be miniaturized.

In the image display device 410, the arrangement angles of the laser light sources 31, 32, and 33 are adjusted to allow the principal beams from the laser light sources 31, 32, and 33 to transmit through the central portion of the two-dimensional light modulator 5a. In the sixth embodiment, the respective components may be designed to allow the principal beams from the laser light sources 31, 32, and 33 to transmit through the central portion of the two-dimensional light modulator 5a. For instance, a lens or a mirror may be disposed between the first lens 1, and the laser light sources 31, 32, and 33 to allow the principal beams from the laser light sources 31, 32, and 33 to transmit through the central portion of the two-dimensional light modulator 5a.

Figure 13:
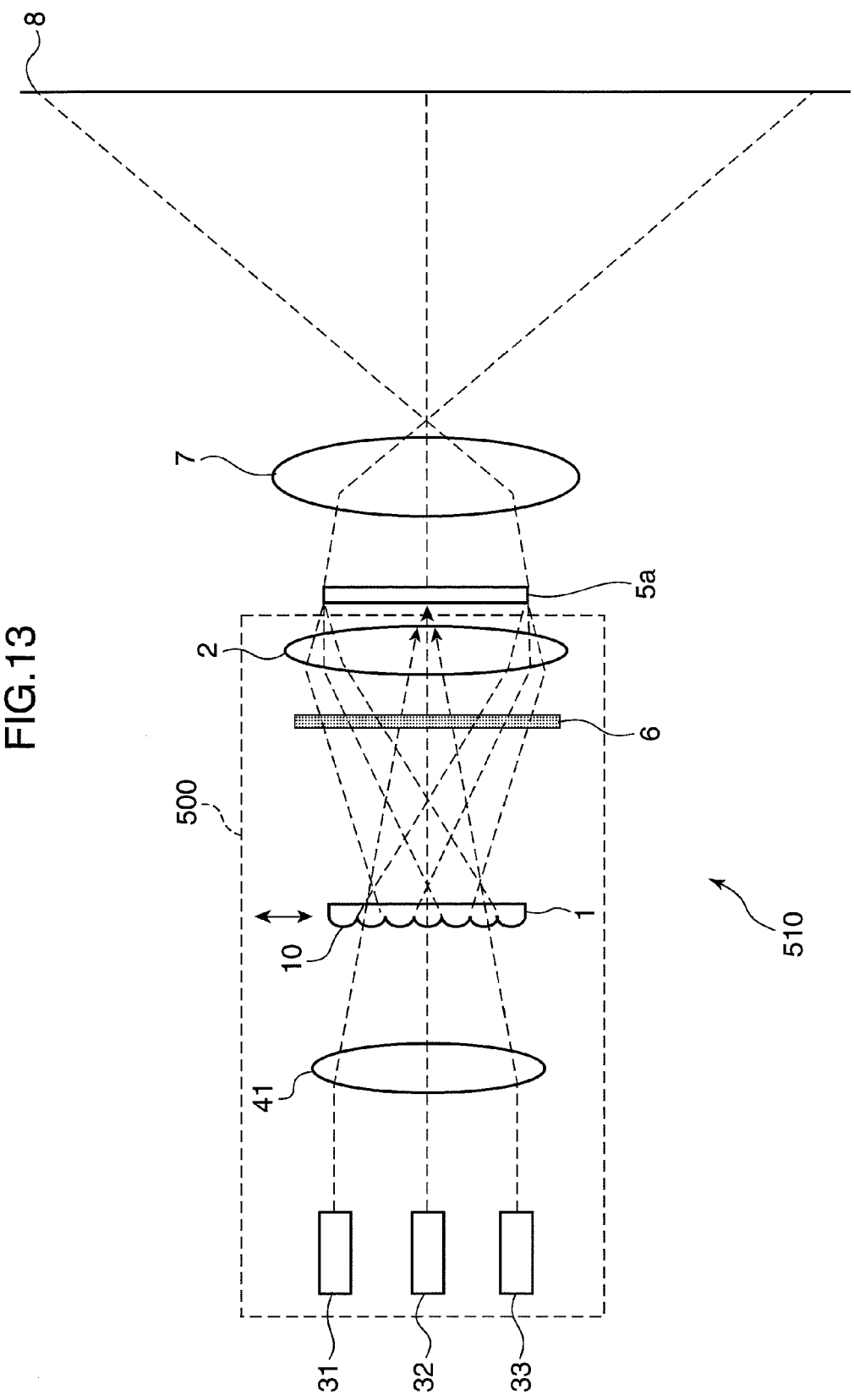
FIG. 13 is a schematic diagram showing an arrangement of an image display device as a modification of the sixth embodiment of the invention.

FIG. 13 is a schematic diagram showing an arrangement of an image display device as a modification of the sixth embodiment of the invention. Elements having the same arrangement as the corresponding elements in the sixth embodiment are indicated with the same reference numerals as the corresponding elements, and description thereof is omitted herein. An image display device 510 as the modification of the sixth embodiment includes a laser illuminating device 500, a two-dimensional light modulator 5a, a projection lens 7, and a screen 8. The laser illuminating device 500 includes a first lens 1, a second lens 2, a light diffuser 6, laser light sources 31, 32, and 33, and an image forming lens 41.

The image forming lens 41 is disposed between the laser light sources 31, 32, and 33, and the first lens 1, and light source images of the laser light sources 31, 32, and 33 are formed on the central portion of the two-dimensional light modulator 5a.

Laser light emitted from the laser light sources 31, 32, and 33 is incident into the image forming lens 41, respectively. Laser light exiting from the image forming lens 41 is incident into the first lens 1. In the incidence, an image is formed in such a manner that the laser light emitted from the laser light sources 31, 32, and 33 is transmitted through the central portion on the two-dimensional light modulator 5a as an illumination plane. The arrangement after the first lens 1 is substantially the same as the arrangement shown in FIG. 12.

As described above, since the image forming lens 41 for forming light source images from the laser light sources 31, 32, and 33 on the central portion of the two-dimensional light modulator 5a is disposed between the laser light sources 31, 32, and 33, and the first lens 1, an increase in the illumination area can be suppressed even with use of the first lens 1 having a large effective diameter, and light amount loss and beam shaping deterioration can be suppressed. Further, an effect substantially the same as the sixth embodiment can be obtained.

The invention is not limited to the arrangement of the sixth embodiment, but may be applicable to a laser illuminating device and an image display device incorporated with a laser light source for emitting laser light of three or more colors including red, green, and blue. The wavelength of a laser light source, and the laser light emission shape are not specifically limited, but an array structure such as a multi-stripe structure, or an external resonator type laser light source may be used. Further alternatively, the shape of the illumination plane of the laser illuminating device 400 is not limited to a two-dimensional shape, but may be a one-dimensional shape.

In the sixth embodiment, the screen 8 serves as a display plane of the image display device 410. The invention is not specifically limited to the above, but various screens may be used as a display plane. Further alternatively, a configuration for allowing a viewer to directly view an image through a two-dimensional light modulator, without a screen, may be used as an image display device. In the sixth embodiment, the transmissive two-dimensional light modulator 5a is used. Alternatively, a reflective two-dimensional light modulator may be used. The laser illuminating device 400 in the sixth embodiment is operable to compensate for a divergence angle of laser light exiting from the first lens 1 by the second lens 2 to align the laser light substantially in parallel to each other, and converge the laser light. Accordingly, laser light can also be efficiently illuminated on a light modulator requiring a telecentric beam, or a light modulator requiring an optical component such as a PBS (polarized beam splitter) immediately in front of the light modulator, thereby enabling to guide the laser light to the projection lens 7 without light amount loss.

The foregoing embodiments mainly include the features having the following arrangements.

A laser illuminating device according to an aspect of the invention includes: a laser light source; a first lens including a plurality of microlenses each having a predetermined numerical aperture in an in-plane direction, each of the plurality of the microlenses being adapted to expand laser light emitted from the laser light source to thereby superimpose the laser light transmitted through each of the microlenses; and a second lens having an effective diameter larger than an effective diameter of the first lens, and for compensating for a divergence angle of the laser light expanded by each of the plurality of the microlenses.

According to the above arrangement, the first lens for incidence of laser light emitted from the laser light source includes the plurality of the microlenses each having the predetermined numerical aperture in the in-plane direction. Each of the plurality of the microlenses is operable to expand the laser light emitted from the laser light source to thereby superimpose the laser light transmitted through each of the microlenses. The second lens having the effective diameter larger than the effective diameter of the first lens is operable to compensate for the divergence angle of the laser light expanded by each of the plurality of the microlenses.

As described above, since each of the plurality of the microlenses is operable to expand the laser light emitted from the laser light source for superimposition, speckle noises in a diffraction field and an image field can be removed. Further, each of the plurality of the microlenses having the predetermined numerical aperture in the in-plane direction is operable to uniformly illuminate an illumination plane. Furthermore, since the plurality of the microlenses of the first lens are operable to expand the laser light emitted from the laser light source and superimpose the expanded laser light, there is no need of providing plural optical systems such as an optical system for expanding laser light and a relay optical system for superimposing laser light. This enables to realize miniaturization. Further, the second lens is operable to secure light intensity uniformity on an outer perimeter of the illumination plane, and converge a laser beam for illumination.

Preferably, the laser illuminating device may further include a moving mechanism for moving the first lens in a plane direction perpendicular to an optical axis. In this arrangement, since the first lens is moved in the plane direction perpendicular to the optical axis, speckle noises in a diffraction field and an image field can be more securely removed.

Preferably, in the laser illuminating device, the moving mechanism may have a maximum amplitude larger than a maximum pitch of the microlens in a moving direction thereof.

According to the above arrangement, since the maximum amplitude of the moving mechanism is larger than the maximum pitch of the microlens in the moving direction thereof, a pseudo increase in the light source area can be made proportional to the moving amplitude, and speckle noise can be further reduced. Further, since the pseudo-increased light source area is maximized when the maximum amplitude of the moving mechanism is larger than the maximum pitch of the microlens in the moving direction thereof, the light intensity can be made more uniform.

Preferably, the laser illuminating device may further include a light diffuser disposed on a laser light incident side of the second lens and for diffusing the laser light expanded by each of the plurality of the microlenses.

According to the above arrangement, since the light diffuser is disposed on the laser light incident side of the second lens, speckle noise can be reduced, and light intensity variation of laser light can be reduced, thereby making the light intensity distribution of laser light on the illumination plane uniform.

Preferably, the laser illuminating device may satisfy the relations expressed by the formulas (1) through (3), wherein L is a distance between the first lens and the second lens, R1 is the effective diameter of the first lens, R2 is the effective diameter of the second lens, BF2 is a back focus distance of the second lens, and NAm is the numerical aperture of the microlens.

$$L-R1/NAm<BF2<L+R1/NAm \quad (1)$$

$$R2>2\times R1 \quad (2)$$

$$R2<4\times L\times NAm \quad (3)$$

According to the above arrangement, in the case where the back focus distance BF2 of the second lens satisfies the formula (1), laser light transmitted through the central portion of the second lens can be aligned substantially in parallel to each other, and laser light transmitted through an outer perimeter of the second lens can be inwardly bent. Thus, the divergence angle of laser light expanded by the plurality of the microlenses can be compensated for. Also, in the case where the back focus distance BF2 satisfies the formula (1), uniform illumination and light transmission without light amount loss can be realized. Further, the effective diameter R2 of the second lens is substantially equal to the size of the illumination plane. In the case where the effective diameter R1 of the first lens satisfies the formula (2), the effective diameter R1 of the first lens becomes equal to a half of the effective diameter R2 of the second lens, or less. This enables to sufficiently miniaturize the device. Furthermore, in the case where the effective diameter R2 of the second lens and the numerical aperture NAm of the microlens satisfy the formula (3), laser light through the plurality of the microlenses can be superimposed on the second lens, and the light intensity distribution of laser light can be made uniform.

Preferably, in the laser illuminating device, the laser light source may emit a plurality of the laser light having wavelengths different from each other, and the laser illuminating device may satisfy the relations expressed by the formulas (4) and (5), wherein $\lambda l$ is a longest wavelength to be used in the laser light source, $\lambda s$ is a shortest wavelength to be used in the laser light source, R1 is the effective diameter of the first lens, and d is a minimum pitch of the microlens.

$$d>10\times(\lambda l-\lambda s) \quad (4)$$

$$d<R1/3 \quad (5)$$

According to the above arrangement, causing the minimum pitch d of the microlens to satisfy the relation expressed by the formula (4) enables to suppress chromatic aberration by diffraction, even in using a plurality of laser light having wavelengths different from each other. Thereby, beam shaping deterioration of the respective laser light on the illumination plane can be suppressed. Further, in the case where the number of the microlenses is three or less, decentering of the microlenses with respect to an incident beam may obstruct uniform light intensity distribution of laser light. However, in the case where the minimum pitch d of the microlenses satisfies the relation expressed by the formula (5), the number of the microlenses becomes at least three or more. Thereby, light intensity distribution of laser light can be made uniform, without being affected by a variation with respect to each of the laser light sources, or adjustment precision.

Preferably, in the laser illuminating device, the laser light source may emit a plurality of the laser light having wavelengths different from each other, and the plurality of the laser light may be coaxially aligned for incidence into the first lens.

According to the above arrangement, since the plurality of laser light having the wavelengths different from each other is coaxially aligned for incidence into the first lens, the plurality of laser light having the wavelengths different from each other can uniformly illuminate the illumination plane.

Preferably, in the laser illuminating device, each of the microlenses may include a first cylindrical lens portion formed on a laser light incident surface of the microlens, and a second cylindrical lens portion having a numerical aperture different from a numerical aperture of the first cylindrical lens portion, and formed on a laser light exit surface of the microlens in a direction orthogonal to the first cylindrical lens portion.

According to the above arrangement, the laser light emitted from the laser light source is expanded in a predetermined direction with an angle corresponding to the numerical aperture of the first cylindrical lens portion, and the laser light expanded by the first cylindrical lens portion is expanded in a direction orthogonal to the predetermined direction with an angle corresponding to the numerical aperture of the second cylindrical lens portion. This arrangement enables to make the light intensity distribution of laser light on the illumination plane uniform. This arrangement also enables to facilitate molding and processing of the first lens constituted of the microlenses, and enhance the productivity.

Preferably, in the laser illuminating device, the numerical aperture of the first cylindrical lens portion may be larger than the numerical aperture of the second cylindrical lens portion.

According to the above arrangement, since the numerical aperture of the first cylindrical lens portion is larger than the numerical aperture of the second cylindrical lens portion, spherical aberration can be reduced, and precise beam shaping can be performed.

Preferably, in the laser illuminating device, the plurality of the microlenses may have the respective predetermined numerical apertures in the in-plane direction, and at least one of the plurality of the microlenses may have a lens diameter different from a lens diameter of the other ones of the plurality of the microlenses.

According to the above arrangement, since the plurality of the microlenses have the respective predetermined numerical apertures in the in-plane direction, and at least one of the plurality of the microlenses has a lens diameter different from the lens diameter of the other ones of the plurality of the microlenses, a diffraction pattern of laser light generated in using microlenses having an identical lens diameter can be eliminated.

Preferably, in the laser illuminating device, the shape of each of the plurality of the microlenses may be changed, as the each microlens is distanced from the optical axis of the laser light to allow the first lens as a whole to have a lens function.

According to the above arrangement, since the first lens as a whole has the lens function, laser light through the microlenses can be superimposed on the central portion of the illumination plane, without depending on the incident position and the effective diameter of the first lens. Superimposing the laser light on the central portion of the illumination plane enables to eliminate light amount loss in the vicinity of the illumination plane, and perform uniform illumination free of light intensity variation and light intensity lowering on an outer perimeter of the illumination plane. Further, superimposing the laser light through the microlenses on the outer perimeter of the illumination plane, as well as the central portion of the illumination plane enables to reduce speckle noise.

Preferably, in the laser illuminating device, each of the plurality of the microlenses may include a convex lens portion and a concave lens portion having a numerical aperture identical to a numerical aperture of the convex lens portion, and the convex lens portions and the concave lens portions may be alternately and sequentially arranged in the in-plane direction.

According to the above arrangement, since the convex lens portions and the concave lens portions are alternately and sequentially arranged in the in-plane direction, connecting portions between the adjacent microlenses are made smooth, and molding can be facilitated. Further, using the convex lens portions and the concave lens portions having identical numerical apertures to each other enables to displace the focal planes of the microlenses in the optical axis direction from each other. Thereby, patterns of laser light to be superimposed through the microlens can be made differentiated in the optical axis direction, and speckle noise can be further reduced.

Preferably, in the laser illuminating device, the plurality of the microlenses may include: a first microlens having a convex cylindrical lens portion with a convex surface on a laser light incident surface of the microlens, and the convex cylindrical lens portion on a laser light exit surface of the microlens; a second microlens having the convex cylindrical lens portion on a laser light incident surface of the microlens, and a concave cylindrical lens portion with a concave surface on a laser light exit surface of the microlens; a third microlens having the concave cylindrical lens portion on a laser light incident surface of the microlens, and the convex cylindrical lens portion on a laser light exit surface of the microlens; and a fourth microlens having the concave cylindrical lens portion on a laser light incident surface of the microlens, and the concave cylindrical lens portion on a laser light exit surface of the microlens, and a diffusing direction of the laser light through the convex cylindrical lens portion on the laser light incident surface and the concave cylindrical lens portion on the laser light incident surface, and a diffusing direction of the laser light through the convex cylindrical lens portion on the laser light exit surface and the concave cylindrical lens portion on the laser light exit surface may be orthogonal to each other.

According to the above arrangement, combinations of the convex cylindrical lens portions and the concave cylindrical lens portions are formed on the laser light incident surfaces and the laser light exit surfaces of the microlenses; and the diffusing direction of the laser light through the convex cylindrical lens portion on the laser light incident surface and the concave cylindrical lens portion on the laser light incident surface, and the diffusing direction of the laser light through the convex cylindrical lens portion on the laser light exit surface and the concave cylindrical lens portion on the laser light exit surface are orthogonal to each other. Thus, differentiating the numerical apertures on the laser light incident surfaces and the laser light exit surfaces of the microlenses enables to irradiate laser light in superimposed manner.

An image display device according to another aspect of the invention includes the aforementioned laser illuminating device, and a light modulator disposed on a laser light exit side of the second lens, and for modulating the laser light exiting from the second lens.

According to the above arrangement, the first lens for incidence of laser light emitted from the laser light source includes the plurality of the microlenses each having the predetermined numerical aperture in the in-plane direction. Each of the plurality of the microlenses is operable to expand the laser light emitted from the laser light source, and each of the plurality of the microlenses is operable to displace the laser light emitted from the laser light source for superimposition. The second lens having the effective diameter larger than the effective diameter of the first lens is operable to compensate for the divergence angle of the laser light expanded by each of the plurality of the microlenses. Thereafter, the light modulator is operable to modulate the laser light exiting from the second lens.

As described above, since each of the plurality of the microlenses is operable to expand the laser light emitted from the laser light source for superimposition, speckle noises in a diffraction field and an image field can be removed. Further, each of the plurality of the microlenses having the predetermined numerical aperture in the in-plane direction is operable to uniformly illuminate the light modulator. Furthermore, since the plurality of the microlenses of the first lens are operable to expand the laser light emitted from the laser light source and superimpose the expanded laser light, there is no need of providing plural optical systems such as an optical system for expanding laser light and a relay optical system for superimposing laser light. This enables to realize miniaturization.

Preferably, the image display device may further include an image forming lens disposed between the laser light source and the first lens, and for forming a light source image of the laser light source on a central portion of the light modulator.

According to the above arrangement, since the image forming lens for forming a light source image of the laser light source on the central portion of the light modulator is disposed between the laser light source and the first lens, an increase in the illumination area can be suppressed even with use of the first lens having a large effective diameter, and light amount loss and beam shaping deterioration can be suppressed.

Preferably, in the image display device, a ratio of the numerical apertures between the plurality of the microlenses in the in-plane direction may be identical to an aspect ratio of the light modulator.

According to the above arrangement, since the ratio of the numerical apertures between the plurality of the microlenses in the in-plane direction is identical to the aspect ratio of the light modulator, beam shaping free of light amount loss can be performed by setting the ratio of the numerical apertures between the microlenses identical to the aspect ratio of the light modulator.

Preferably, in the image display device, the laser light source may include a plurality of the laser light sources for emitting the laser light having wavelengths different from each other, principal beams of all the laser light to be emitted from the plurality of the laser light sources may be allowed to transmit through a center of the light modulator, and the principal beams of the laser light to be emitted from at least one or more of the laser light sources out of the plurality of the laser light sources may be incident into the first lens at a certain angle.

According to the above arrangement, since the principal beams of all the laser light are allowed to transmit through the center of the light modulator, a uniform light intensity distribution can be obtained on the central portion of the light modulator, without depending on the wavelength of laser light, and light amount loss resulting from beam shaping deterioration can be eliminated.

Preferably, in the image display device, the laser light sources may include at least a red laser light source for emitting red laser light, a green laser light source for emitting green laser light, and a blue laser light source for emitting blue laser light.

According to the above arrangement, since the red laser light, the green laser light, and the blue laser light are incident into the light modulator, a color image can be displayed.

Industrial Applicability

A laser illuminating device and an image display device of the present invention enable to remove speckle noises in a diffraction field and an image field, uniformly illuminate an illumination plane, and realize miniaturization, and accordingly, are useful as a laser illuminating device incorporated with a laser as a light source, and an image display device for displaying an image with use of a laser illuminating device or a like device.

The invention claimed is:

1. A laser illuminating device comprising:
a laser light source;
a first lens including a plurality of microlenses, each microlens of the plurality of microlenses having a predetermined numerical aperture in an in-plane direction, and each microlens of the plurality of microlenses being adapted to expand laser light emitted from the laser light source to thereby superimpose the laser light transmitted through each microlens of the plurality of microlenses; and
a second lens having an effective diameter larger than an effective diameter of the first lens, and for compensating for a divergence angle of the laser light expanded by each microlens of the plurality of microlenses,
wherein the laser light source emits a plurality of the laser light, such that each laser light emitted from the laser light source has a wavelength that is different from wavelengths of other laser lights emitted from the laser light source, and
wherein the laser illuminating device satisfies relations expressed by formulas (1) through (5):

$$d > 10 \times (\lambda l - \lambda s) \quad (1);$$

$$d < R1/3 \quad (2);$$

$$L - R1/NAm < BF2 < L + R1/NAm \quad (3);$$

$$R2 > 2 \times R1 \quad (4); \text{ and}$$

$$R2 < 4 \times L \times NAm \quad (5),$$

where $\lambda 1$ is a longest wavelength to be used in the laser light source, $\lambda s$ is a shortest wavelength to be used in the laser light source, R1 is the effective diameter of the first lens, d is a minimum pitch of each microlens of the plurality of microlenses, L is a distance between the first lens and the second lens, R2 is the effective diameter of the second lens, BF2 is a back focus distance of the second lens, and NAm is a numerical aperture of each microlens of the plurality of microlenses.

2. The laser illuminating device according to claim 1, further comprising a moving mechanism for moving the first lens in a plane direction perpendicular to an optical axis.

3. The laser illuminating device according to claim 2, wherein the moving mechanism has a maximum amplitude larger than a maximum pitch of a microlens, of the plurality of microlenses, in a moving direction thereof.

4. The laser illuminating device according to claim 1, further comprising a light diffuser disposed on a laser light incident side of the second lens and for diffusing the laser light expanded by each microlens of the plurality of microlenses.

5. The laser illuminating device according to claim 1, wherein
the plurality of the laser light is coaxially aligned for incidence into the first lens.

6. The laser illuminating device according to claim 1, wherein each respective microlens of the plurality of microlenses includes:
a first cylindrical lens portion formed on a laser light incident surface of the respective microlens; and
a second cylindrical lens portion having a numerical aperture different from a numerical aperture of the first cylindrical lens portion, and formed on a laser light exit surface of the respective microlens in a direction orthogonal to the first cylindrical lens portion.

7. The laser illuminating device according to claim 6, wherein the numerical aperture of the first cylindrical lens portion is larger than the numerical aperture of the second cylindrical lens portion.

8. The laser illuminating device according to claim 1, wherein
at least one microlens of the plurality of the microlenses has a lens diameter different from a lens diameter of other microlenses of the plurality of microlenses.

9. The laser illuminating device according to claim 1, wherein a shape of each microlens of the plurality of microlenses is different from a shape of other microlenses of the plurality of microlenses, as each microlens is distanced from an optical axis of the laser light to allow the first lens as a whole to have a lens function.

10. The laser illuminating device according to claim 1,
wherein each microlens of the plurality of microlenses includes a convex lens portion and a concave lens portion having a numerical aperture identical to a numerical aperture of the convex lens portion, and
wherein the convex lens portions and the concave lens portions of the plurality of microlenses are alternately and sequentially arranged in the in-plane direction.

11. The laser illuminating device according to claim 10, wherein the plurality of microlenses includes:
a first microlens having a convex cylindrical lens portion with a convex surface on a laser light incident surface of the first microlens, and the convex cylindrical lens portion on a laser light exit surface of the first microlens;
a second microlens having the convex cylindrical lens portion on a laser light incident surface of the second microlens, and a concave cylindrical lens portion with a concave surface on a laser light exit surface of the second microlens;
a third microlens having the concave cylindrical lens portion on a laser light incident surface of the third microlens, and the convex cylindrical lens portion on a laser light exit surface of the third microlens; and
a fourth microlens having the concave cylindrical lens portion on a laser light incident surface of the fourth microlens, and the concave cylindrical lens portion on a laser light exit surface of the fourth microlens, and
wherein a diffusing direction of the laser light through the convex cylindrical lens portion on the laser light incident surface of the first and second microlenses and the concave cylindrical lens portion on the laser light incident surface of the third and fourth microlenses, and a diffusing direction of the laser light through the convex cylindrical lens portion on the laser light exit surface of the first and third microlenses and the concave cylindrical lens portion on the laser light exit surface of the second and fourth microlenses are orthogonal to each other.

12. An image display device comprising:
the laser illuminating device of claim 1; and
a light modulator disposed on a laser light exit side of the second lens, and for modulating the laser light exiting from the second lens.

13. The image display device according to claim 12, further comprising an image forming lens disposed between the laser light source and the first lens, and for forming a light source image of the laser light source on a central portion of the light modulator.

14. The image display device according to claim 12, wherein a ratio of the numerical apertures between the plurality of the microlenses in the in-plane direction is identical to an aspect ratio of the light modulator.

15. The image display device according to claim 12,
wherein the laser light source includes a plurality of laser light sources for emitting laser lights having wavelengths different from each other,
wherein principal beams of all of the laser lights to be emitted from the plurality of the laser light sources are allowed to transmit through a center of the light modulator, and
wherein the principal beams of the laser lights to be emitted from at least one or more laser light sources of the plurality of laser light sources are incident into the first lens at a certain angle.

16. The image display device according to claim 15, wherein the plurality of laser light sources includes at least a red laser light source for emitting red laser light, a green laser light source for emitting green laser light, and a blue laser light source for emitting blue laser light.

* * * * *